United States Patent
Gandrud et al.

(10) Patent No.: US 10,972,872 B2
(45) Date of Patent: Apr. 6, 2021

(54) TRAVEL COMPLIANCE DETECTION USING BODY-WORN OFFENDER MONITORING ELECTRONIC DEVICES

(71) Applicant: ATTENTI ELECTRONIC MONITORING LTD., Tel Aviv (IL)

(72) Inventors: Jonathan Dale Gandrud, Woodbury, MN (US); Arash Sangari, St. Paul, MN (US); David Solomon Segal, St. Paul, MN (US); Saber Taghvaeeyan, St. Paul, MN (US)

(73) Assignee: ATTENTI ELECTRONIC MONITORING LTD, Tel Aviv (IL)

( * ) Notice: Subject to any disclaimer, the term of this patent is extended or adjusted under 35 U.S.C. 154(b) by 0 days.

(21) Appl. No.: 16/642,037

(22) PCT Filed: Jul. 19, 2018

(86) PCT No.: PCT/IL2018/050799
§ 371 (c)(1),
(2) Date: Feb. 26, 2020

(87) PCT Pub. No.: WO2019/043683
PCT Pub. Date: Mar. 7, 2019

(65) Prior Publication Data
US 2020/0252752 A1    Aug. 6, 2020

Related U.S. Application Data

(60) Provisional application No. 62/552,678, filed on Aug. 31, 2017.

(51) Int. Cl.
H04W 4/029    (2018.01)
H04B 7/185    (2006.01)
G08B 21/02    (2006.01)

(52) U.S. Cl.
CPC ........ H04W 4/029 (2018.02); G08B 21/0286 (2013.01); H04B 7/18506 (2013.01)

(58) Field of Classification Search
CPC ............ G08B 21/0225; G08B 21/0236; G08B 21/028; G08B 21/0283; G08B 21/0286
See application file for complete search history.

(56) References Cited

U.S. PATENT DOCUMENTS

2001/0026240 A1* 10/2001 Neher .................. G08B 25/016
                                                                342/357.75
2004/0089314 A1*  5/2004 Felter .................... A24F 47/008
                                                                131/194

(Continued)

Primary Examiner — Kevin Kim
(74) Attorney, Agent, or Firm — Soroker Agmon Nordman

(57) ABSTRACT

A body-worn tracking device (BWTD) includes a global navigation satellite system (GNSS) device, a cellular communication unit, at least one processor, and at least one memory device. The at least one memory device includes instructions that, when executed by the at least one processor, cause the at least one processor to determine whether the BWTD is located on board an aircraft. Execution of the instructions further causes the at least one processor to, responsive to determining that the BWTD is located on board the aircraft: disable the GNSS device and the cellular communication unit; and temporarily refrain from generating an alert that indicates a current location of the BWTD cannot be determined.

20 Claims, 6 Drawing Sheets

(56) References Cited

U.S. PATENT DOCUMENTS

| | | | |
|---|---|---|---|
| 2005/0068169 A1* | 3/2005 | Copley | G08B 21/0283 340/539.13 |
| 2008/0088437 A1* | 4/2008 | Aninye | H04L 67/18 340/539.13 |
| 2011/0125454 A1 | 5/2011 | Wengler | |
| 2011/0288938 A1* | 11/2011 | Cook | G06Q 30/0643 705/14.66 |
| 2012/0235860 A1 | 9/2012 | Ghazarian | |
| 2014/0278220 A1* | 9/2014 | Yuen | A61B 5/02427 702/150 |
| 2014/0370917 A1* | 12/2014 | Buchheim | H04W 4/023 455/456.1 |
| 2016/0112835 A1 | 4/2016 | McConathy | |
| 2017/0039840 A1 | 2/2017 | Rajala | |
| 2017/0142246 A1 | 5/2017 | Economy et al. | |
| 2017/0374506 A1* | 12/2017 | Rai | H04W 4/021 |
| 2018/0192374 A1* | 7/2018 | Jain | H04W 4/029 |

* cited by examiner

US 10,972,872 B2

TRAVEL COMPLIANCE DETECTION USING BODY-WORN OFFENDER MONITORING ELECTRONIC DEVICES

TECHNICAL FIELD

This disclosure relates to information systems for tracking geospatial location information related to monitored persons or objects.

BACKGROUND

Released criminal offenders on community supervision, either probation or parole, may be monitored with body-worn tracking devices (BWTDs) by a criminal justice supervising agency, such as a department of corrections or local law enforcement. The monitoring is based on a sentence, and often includes restricted regions and permissible regions with a schedule for the day of the week and a range of times associated with those areas when the released criminal offender is required to be or required not to be in those areas. A released criminal offender's geospatial location at a given date and time is monitored and recorded by tracking devices worn or carried by the released criminal offender. This geospatial information, including date and time information, can be used to determine a released criminal offender's compliance with their sentence. Activities of released criminal offenders can be reported to the criminal justice supervising agency or to a probation or parole officer by fax, page, text message or email generated by a monitoring center unique to the criminal justice supervising agency.

SUMMARY

Techniques of this disclosure are directed to detecting compliance with permitted travel plans using a body-worn tracking devices (BWTD) worn by a monitored person. In some examples, a computing device (e.g., a processor of a BWTD, a local computer, a server of a monitoring system, etc.) determines whether the BWTD is on board a permitted vehicle (e.g., in an automobile, train, aircraft, marine craft, etc.) when the vehicle prevents the BWTD from determining its GPS coordinates. For example, a monitored person may be permitted to travel to a particular destination via a particular flight. In some instances, the computing device may determine whether the BWTD is on board an aircraft. In some instances, the computing device may determine whether the BWTD is on board the correct aircraft (e.g., an aircraft flying the particular flight) to the permitted destination. In some example implementations, the computing device may determine whether the BWTD is on board an aircraft based on a wireless connection between the BWTD and one or more non-cellular wireless communication systems (e.g., via a connection between the BWTD and an WiFi® system on board the aircraft).

Rather than outputting alerts (e.g., notifying law enforcement personnel) that a monitored person is potentially in violation of his or her parole when the GPS coordinates of the BWTD are unavailable, in some examples, the computing device may temporarily refrain from outputting alerts in response to determining that the BWTD is on board an aircraft. Refraining from outputting alerts while the BWTD is on an aircraft may reduce the number of false alerts, may advantageously reduce the burden on computing resources of the BWTD and/or a receiving monitoring system, the amount of data transferred between the BWTD and monitoring system, and generally the number of notifications processed and provided to the monitored person and/or law enforcement. Reducing the number of notifications may improve processing efficiencies, and ease the burden on monitored persons and/or law enforcement in assisting monitored persons to stay within permitted geographic boundaries. In some examples, the BWTD may automatically disable one or more wireless transceivers (e.g., GPS device, cellular devices, etc.) in response to determining that the BWTD is on board an aircraft, which may reduce the power consumed by the BWTD and improve the battery life of the BWTD.

In an example, this disclosure describes a body-worn tracking device (BWTD) comprising: a global navigation satellite system (GNSS) device; a cellular communication unit; at least one processor; and at least one memory device comprising instructions that, when executed by the at least one processor, cause the at least one processor to: determine whether the BWTD is located on board an aircraft; and responsive to determining that the BWTD is located on board the aircraft: disable the GNSS device and the cellular communication unit; and temporarily refrain from generating an alert that indicates a current location of the BWTD cannot be determined.

In another example, this disclosure describes a method comprising: determining, by one or more processors, whether a body-worn tracking device (BWTD) is located on board an aircraft; and responsive to determining that the BWTD is located on board the aircraft: disabling, by the one or more processors, a GNSS device of the BWTD and a cellular communication unit of the BWTD; and temporarily refraining, by the one or more processors, from generating an alert that indicates a current location of the BWTD cannot be determined.

The details of one or more examples are set forth in the accompanying drawings and the description below. Other features, objects, and advantages of the disclosure will be apparent from the description, drawings, and claims.

DETAILED DESCRIPTION

Figure 1:
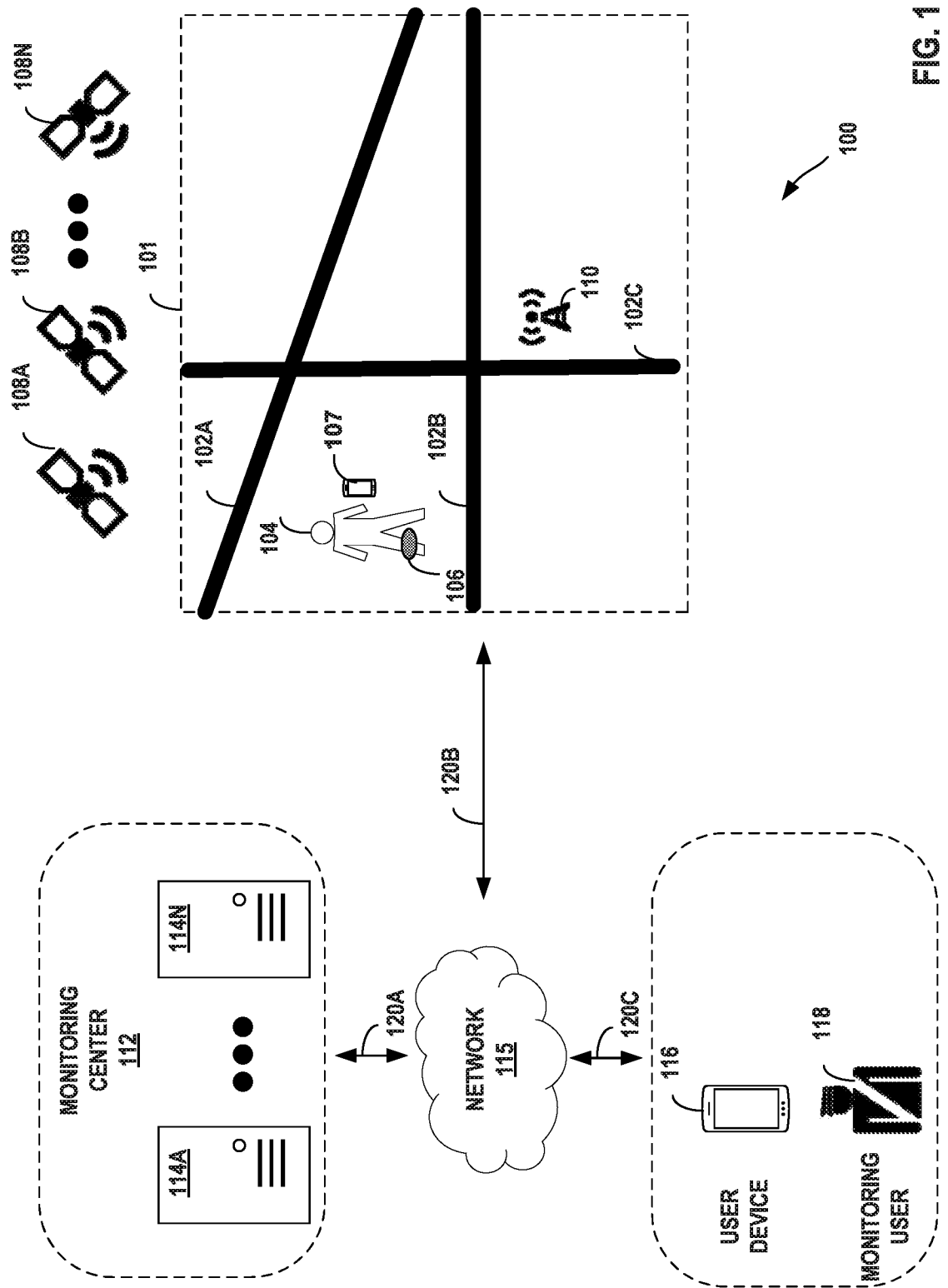
FIG. 1 is a conceptual diagram illustrating an example monitoring system for determining a location of a body-worn tracking device, in accordance with one or more aspects of this disclosure.

In an offender monitoring system, each offender is typically assigned a device (e.g., a body-worn tracking device (BWTD)) that determines and stores a variety of data such as location, speed, heading, or the like at prescribed intervals (e.g., every minute). The device typically includes a Global Navigation Satellite System (GNSS) device (e.g., a Global Positioning System (GPS) receiver) to help determine when the offender violates the terms of his or her parole (e.g., by entering prohibited geographic areas or exiting permitted areas). However, GNSS devices may temporarily be unable to receive signals from a sufficient number of GNSS satellites, for example, due to surrounding structure or environmental features. When the GNSS device of a BWTD does not receive signals from a sufficient number of GNSS satellites, the BWTD may be unable to determine its current GNSS coordinates, which may limit the ability of law enforcement to ensure the offender complies with the terms of his or her parole. An offender wearing a BWTD may also be referred to as a monitored person or monitored target.

Typically, when a BWTD is unable to determine its GNSS coordinates, the BWTD and/or a monitoring system may generate an alert. For example, the BWTD may output a message or alert instructing the offender to proceed to an area where the GNSS coordinates can be determined (e.g., go outside). The BWTD may output a message to a monitoring center indicating that the BWTD is unable to determine its current GNSS coordinates. In some instances, the monitoring system may output a notification (e.g., to law enforcement personnel) indicating that the BWTD cannot determine its GNSS coordinates, which may indicate that monitored person is potentially in violation of his or her parole.

Certain types of vehicles (e.g., an aircraft, marine craft, train, etc.) may reduce or eliminate the ability of a BWTD to receive signals from GNSS satellites (e.g., due to the shape, size, and/or materials of the vehicle), thus potentially preventing the BWTD from determining its GNSS coordinates when the BWTD is located in the vehicle. Because the BWTD may be unable to determine its GNSS coordinates for an extended amount of time while traveling in certain vehicles (e.g., while on an aircraft), the monitored person assigned to wear the BWTD may be effectively prohibited from traveling in certain vehicles. Thus, conventionally, should the monitored person attempt to travel via aircraft (e.g., even to a destination to which the monitored person is permitted to travel), the monitoring system and/or BWTD may erroneously generate alerts indicating the monitored person is violation of his or her parole.

In accordance with various techniques of this disclosure, a monitoring system and/or BWTD may determine whether a BWTD, and hence a monitored person assigned to wear the BWTD, is located on board an aircraft and may temporarily refrain from generating alerts while the BWTD is on board the aircraft. Additionally, the monitoring system and/or BWTD may determine whether the aircraft is an aircraft the monitored person is permitted to be on. Additionally or alternatively, the monitoring system and/or BWTD may determine whether the destination of the aircraft is a location to which the monitored person is permitted to travel. In other words, the monitoring system may determine whether the monitored person is on an aircraft and if so, where the aircraft is headed. The BWTD may communicate with the monitoring system via the aircraft's WiFi® network during flight to track the BWTD during the flight. Thus, in some examples, the BWTD and/or monitoring system may refrain from generating alerts to the monitored person and/or law enforcement personnel while the BWTD is on the aircraft. Refraining from outputting alerts while the BWTD is on the aircraft may reduce the number of false alerts, which may reduce the amount of data transferred between the BWTD and monitoring system. Reducing the number of alerts may ease the burden on monitored persons and/or law enforcement in assisting monitored persons to stay within permitted geographic boundaries. In some examples, the BWTD may automatically disable one or more wireless transceivers (e.g., GPS device, cellular radios, etc.) in response to determining that the BWTD is on board an aircraft, which may reduce the power consumed by the BWTD and improve the battery life of the BWTD.

FIG. 1 is a conceptual view illustrating an example monitoring system 100 for determining a location of a body-worn tracking device, in accordance with one or more aspects of this disclosure. Monitoring system 100 comprises a body-worn tracking device (BWTD) 106, satellites 108A through 108N (collectively, "satellites 108"), a monitoring center 112, a network 115, and a user device 116. People shown in the example of FIG. 1 are not considered part of monitoring system 100. A monitored target 104 wears BWTD 106. Monitoring system 100 tracks the location of BWTD 106, and thereby tracks the location of monitored target 104. Although not shown in the example of FIG. 1 for the sake of simplicity, monitoring system 100 may track the locations of multiple BWTDs, and thereby track the locations of multiple monitored targets.

In the example of FIG. 1, monitored target 104 and BWTD 106 are located within a geographic region 101, which may be a portion of the Earth's surface. In this example, geographic region 101 includes multiple roads 102A-102C ("roads 102") on which monitored target 104 may travel. Geographic region 101 may include human built structures (e.g., houses, buildings, and the like) and/or natural structures (trees, mountains, oceans, lakes, and the like).

In the example of FIG. 1, monitored target 104 is a person wearing BWTD 106. However, in other examples, a monitored target may be a non-human object to which a BWTD is attached. For instance, a monitored target may be an animate object (e.g., an animal, robot) or inanimate object that may move to different locations in a geographic area. In examples where a monitored target is non-human, a BWTD may be any device that is attached to, accompanies or is otherwise physically associated with the movable object, even if not necessarily bodily worn.

Monitored target 104 may be a released criminal offender, although in other examples a monitored target may be any person. Released criminal offenders may be criminal offenders who have been suspected, accused, or convicted of a crime and released from a jail or prison. For instance, when monitored target 104 is released from jail, prison, or other facility, BWTD 106 may be attached by law enforcement to the body of monitored target 104. In some examples, monitored target 104 is an individual with certain a psychological condition, such as dementia or Alzheimer's disease, that makes the individual likely to leave safe areas. In such examples, a caregiver may use BWTD 106 to monitor the location of such an individual.

BWTD 106 may comprise a portable computing device that determines its current location and reports the determined location to monitoring center 112 or another physically separate computing device. Furthermore, BWTD 106 may include a physical housing constructed of plastic or any other suitable material. The housing may include electronics such as, but not limited to: one or more computer processors, one or more memory devices, one or more wired and/or wireless communication devices (e.g., cellular network component, WiFi® component, short-range (e.g., a Near Field Communication (NFC) component, a Bluetooth component, a Universal Serial Bus (USB) component), one or more output devices (e.g., a haptic feedback component, one or more lights, one or more user interface display components, one or more audio components), one or more GNSS components (e.g., a GPS receiver), one or more sensor components (e.g., an accelerometer, a gyroscope, a magnetometer, a barometer, etc.), one or more power sources (e.g., a battery, power supply), and one or more circuit boards that physically, communicatively, and/or electronically couple such components to one another within the housing of BWTD 106.

Each respective satellite of satellites 108 transmits a respective satellite signal indicating a current time and a current location of the respective satellite. BWTD 106 may include a combination of software and hardware components to receive the satellite signals transmitted by satellites 108. In some examples, satellites 108 are global navigation satellites in a global navigation satellite system (GNSS). Example global navigation satellite systems include the GPS satellite network, the Galileo satellite network, the GLONASS satellite network, and other government-operated or commercially-operated satellite networks. Each satellite signal received by BWTD 106 from a satellite of satellites 108 includes data such as the current position of the particular satellite and the current time. Although the example of FIG. 1 only shows three satellites, different numbers of satellites may be used by BWTD 106 to determine the GNSS coordinates of BWTD 106 at a point in time.

In some examples, BWTD 106 is a one-piece design in which GNSS hardware and all other hardware for the BWTD are included in a single physical housing. In other examples, BWTD 106 may not include GNSS hardware, which may be physically separate from, but in communication with, BWTD 106. For instance, monitored target 104 may carry a physical device with GNSS hardware (e.g., such as a computing device 107 having GNSS functionality), and separately BWTD 106 may be attached to monitored target 104 and in communication with computing device 107. Computing device 107 may include a laptop computer, a tablet computer, a smartphone, a desktop computer, a server computer, a body worn computer (e.g., smartwatch, head-mounted device), or any other suitable computing device. Computing device 107 may be configured to interface with BWTD 106 to provide the functionality described herein with respect to BWTD 106.

In some examples, BWTD 106 may further include a combination of software components and hardware components to perform one or more monitoring functions. For example, BWTD 106 may determine and record GNSS coordinates of BWTD 106. For instance, BWTD 106 may receive data from satellites 108 (e.g., data indicative of the position of a particular satellite) and may determine GNSS coordinates of BWTD 106 based on the data received from satellites 108. In some examples, BWTD 106 sends its GNSS coordinates to monitoring center 112 or other physically separate computing device.

BWTD 106 includes one or more sensor components that detects movement of BWTD 106. The sensor components may include hardware or a combination of hardware and software. In some examples, the one or more sensor components include an accelerometer, one or more directionality sensors (e.g., a gyroscope, a magnetometer, and/or other sensors for determining a spatial orientation), and so on. BWTD 106 may receive acceleration data from the accelerometer that indicates amounts of acceleration various axes, such as a vertical axis and a horizontal axis. BWTD 106 may determine a change in the orientation (e.g., direction) of BWTD 106 for each step based on orientation data received from the directionality sensor (e.g., the gyroscope and/or the magnetometer). BWTD 106 may determine the direction of BWTD 106 relative to Earth's magnetic field based on data received from the magnetometer.

BWTD 106 may have a unique device identifier that is different from unique identifiers of each other BWTD in a set of BWTDs. In this way, as monitored target 104 moves to different locations in a geographic region, geographic location points generated by BWTD 106 and stored at monitoring center 112 may be associated with or otherwise attributed to monitored target 104, such that the location and/or whereabouts of monitored target 104 may be monitored.

Monitoring system 100 may also include one or more towers, such as tower 110, that form cellular network infrastructure. Tower 110 may include a physical structure that supports antennae, a GNSS receiver, one or more sets of digital signal processors, transceivers, and control electronics, which collectively operate to establish sessions with end-user devices such as BWTDs, smartphones, or other computing devices. Tower 110, together with one or more other towers that include similar functionality, may be geographically dispersed, so as to provide a geographically dispersed wireless network for voice and/or data communication. Tower 110 and switching infrastructure (not shown) may be owned and operated by wireless or cellular carrier providers that charge customer/subscriber fees to operate on the wireless or cellular carrier provider.

Figure 4:
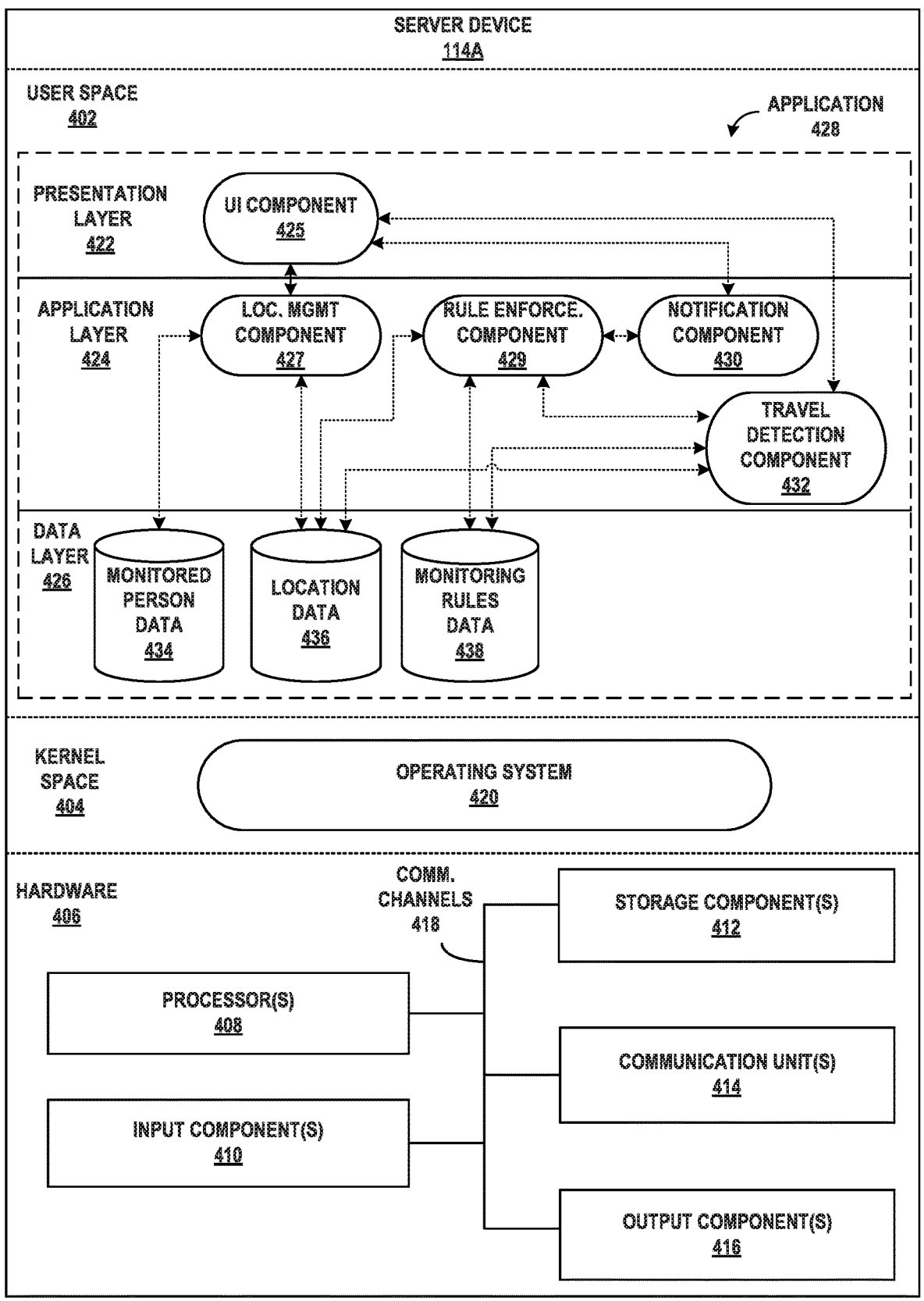
FIG. 4 is a block diagram illustrating example components of a server device, in accordance with one or more aspects of the present disclosure.

Monitoring center 112 may be owned and operated by a private entity or a government entity. Monitoring center 112 includes one or more computing devices, such as server devices 114A-114N ("server devices 114"). As described elsewhere in this disclosure, FIG. 4 illustrates details of example components of server devices 114. Server devices 114 may collectively provide a data center to monitor and track monitored persons based on, among other data, GNSS coordinates of BWTDs that are provided to server devices 114.

In some examples, server devices 114 stores an association between a monitored person and a respective BWTD worn by a monitored target. For instance, at the time that a BWTD is attached to the monitored target, a user may use a separate, end-user computing device in communication with monitoring center 112 to provide user input that creates an association between a unique identifier of the monitored target and a unique identifier of the BWTD. For instance, the association may be stored as a record in a database. Responsive to receiving GNSS coordinates from the BWTD with a unique identifier of BWTD 106, monitoring center 112 may store the GNSS coordinates in association with the unique identifier of BWTD 106. In this way, an operator of monitoring center 112 may determine the GNSS coordinates associated with monitored target 104.

Monitoring center 112 may receive configuration input from users, such as law enforcement officers, that defines authorized and/or unauthorized travel for monitored target 104. Such configuration input may be sent by a computing device (e.g., user device 116) to monitoring center 112 via network 115. The configuration input may specify a unique identifier of monitored target 104 and/or BWTD and may also include information indicating permitted travel for monitored target 104. For instance, the permitted travel information may include permitted modes of travel (e.g., a general mode such as "car" or "plane"), permitted travel dates/times, permitted destinations, or other information indicating when, where, or how monitored target 104 is permitted to travel. In some instances, the permitted travel information includes flight information, such as an airline and/or flight number of a flight upon which monitored target 104 is permitted to travel, departure airport, destination airport, etc.

In some examples, the permitted travel information includes information received from a travel provider (e.g., airline). For example, monitoring center 112 may interface with an airline computing system and may receive information about a particular flight. For instance, a monitoring user 118 may approve monitored target 104 to travel on a particular airline and flight and may save a flight number for the permitted flight to monitoring center 112. Monitoring center 112 may query a remote computing system (e.g., operated by a travel provider) for additional flight information such as a departure location, departure date/time, arrival location, arrival date/time, or any information associated with the permitted flight. In some instances, monitoring center 112 receives (e.g., from a travel provider) flight information, such as information indicative of a wireless network on board a given flight, such as a network service set identifier (SSID) or media access control (MAC) address of a networking device on board a permitted flight).

In this way, monitoring center 112 may associate permitted travel information with BWTD 106 and/or monitored target 104. By associating permitted travel information with BWTD 106 and/or monitored target 104, monitoring center 112 can determine violations, such as, determining whether a monitored person is traveling via a permitted method of transportation, traveling on a permitted day/timeframe, and/or traveling to a permitted destination.

In some examples, BWTD 106 and/or monitoring center 112 may determine that a monitored target 104 is traveling and that the travel is in violation of permitted travel plans. In response to detecting a violation, BWTD 106 and/or monitoring center 112 may send a notification or output an alert indicative of the violation. For instance, monitoring center 112 may send a notification via network 115 to BWTD 106 for the violation, which may cause BWTD 106 to output an alert (e.g., haptic, visual, and/or audio feedback). In some examples, monitoring center 112 may send notifications to one or more monitoring users 118 (e.g., law enforcement personnel) that monitored person 104 is potentially in violation of his or her parole.

Monitoring center 112 may generate user interfaces for display, such as maps that indicate different locations at which BWTD 106 has been physically present. In some examples, monitoring center 112 may illustrate different locations at which BWTD 106 has been physically present over a period of time. Monitoring center 112 may output any data that in any suitable format including still and moving image data, audio data, and the like. For instance, geographic region 101 may be visually represented in a map, which may be two- or three-dimensional. Such maps may be output for display by computing devices as further described in this disclosure. In the example of FIG. 1, a map generated based on geographic region 101 may be visually similar in appearance to the representation of geographic region 101 as illustrated in FIG. 1.

In the example of FIG. 1, monitoring user 118 uses user device 116. Although FIG. 1 shows user device 116 as a smartphone, user device 116 may be various types of computing device. For example, user device 116 may be a laptop computer, a tablet computer, a smartphone, a desktop computer, a server computer, a body worn computer (e.g., smartwatch, head-mounted device), or any other suitable computing device. Although the example of FIG. 1 shows monitoring system 100 as only including a single user device 116, monitoring system 100 may comprise multiple user devices performing functions similar to user device 116.

User device 116 may include one or more components comprising a combination of hardware and software. For instance, user device 116 may execute a monitoring application implemented in software and executable on hardware of user device 116. The monitoring application may provide notifications of violations, maps or other visual representations of monitored offender locations based on real-time or past-generated GNSS coordinates. The monitoring application may also generate and send data that associates a unique identifier of BWTD 106 with a unique identifier of monitored target 104. In some examples, the monitoring application may natively implement functionality described in this disclosure, while in other examples the monitoring application may be a web-browser that accesses a web-based application with such functionality via a web-hosted application executing at monitoring center 112.

Monitoring user 118 may be a law enforcement officer, parole officer, or another type of public safety official or employee. In some examples, monitoring user 118 is a non-public safety office/employee, such as past or potential victims of a monitored offender, a school administrator, or another type of user that may be interested in or need to know of the location or violations of a monitored target. User device 116 may provide notifications to monitoring user 118 in response to messages sent by monitoring center 112.

Network 115 may represent a publicly accessible computer network that is owned and operated by a service provider, which is usually large telecommunications entity or corporation. Although not illustrated in the example of FIG. 1, network 115 may be coupled to one or more networks administered by other providers, and may thus form part of a large-scale public network infrastructure, e.g., the Internet. Network 115 may provide computing devices, such as BWTD 106, user device 116, and monitoring center 112, with access to the Internet, and may allow the computing devices to communicate with each other. In some examples, network 115 may include one or more local area networks (LANs), such that user device 116 may communicate with monitoring center 112 through the Internet and/or a LAN on which both monitoring center 112 and user device 116 are included.

Although additional network devices are not shown in the example of FIG. 1 for ease of explanation, it should be understood that network 115 and monitoring system 100 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. It should be understood that one or more additional network elements may be included along any of network links 120A, 120B, and 120C (collectively, "network links 120"), such that the devices of monitoring system 100 are not directly coupled. Network links 120 may be wired or wireless communication links, such as 100 Mbps, 1 Gbps, or 10 Gbps WiFi connections and/or physical cable connections, to name only a few examples.

To monitor a location of monitored target 104, BWTD 106 may be attached to monitored target 104. In some examples, BWTD 106 includes a tamper-resistant strap that binds BWTD 106 to monitored target 104. BWTD 106 may include one or more components comprised of hardware and/or software that detect if monitored target 104 or another person have tampered with the tamper-resistant strap and/or the housing/internal components of BWTD 106. If BWTD 106 detects that a tampering event is occurring or has occurred, BWTD 106 may send a message via network 115 to monitoring center 112 to indicate the tampering event.

User device 116 may receive indications of user input from monitoring user 118 that define an association between BWTD 106 and monitored target 104 in monitoring center 112. In other words, monitored target 104 may be assigned to wear BWTD 106. User device 116, for example, may output a graphical user interface for display. The graphical user interface may include one or more user interface components, such as input fields, dropdown menus, labels or text fields, or any other graphical component through which BWTD 106 may receive indications of user input from monitoring user 118.

In the example of FIG. 1, user device 116 may receive indications of user input from monitoring user 118 that specify or select a unique identifier of BWTD 106 and may further receive one or more user inputs from monitoring user 118 that specify or select a unique identifier of monitored target 104. In addition to receiving an indication of user input specifying or selecting the unique identifiers of BWTD 106 and/or monitored target 104, user device 116 may receive input from monitoring user 118 to define an association between the respective unique identifiers. User device 116 may send one or more messages to monitoring center 112 that define the association between the unique identifier of monitored target 104 and BWTD 106.

In some examples, user device 116 may receive indications of user input defining information associated with permitted travel for a monitored target 104 assigned to wear BWTD 106. For example, user device 116 may receive an indication of user input defining a permitted travel destination, permitted travel timeframe (e.g., permitted flight dates and/or times), permitted methods of travel (e.g., a permitted flight number), or any combination therein. User device 116 may send one or more messages to monitoring center 112 with the permitted travel information as specified by monitoring user 118, and monitoring center 112 may configure or associate the permitted travel information with the unique identifier of monitored target 104 and BWTD 106.

After BWTD 106 has been attached to monitored target 104, monitored target 104 may be released from custody (e.g., released from a confined or restricted condition, such as a jail, prison, or courthouse). As monitored target 104 moves throughout a geographic region, such as geographic region 101, BWTD 106 determines respective GNSS coordinates of BWTD 106 and sends messages to monitoring center 112 that may include at least a unique identifier of BWTD 106 and/or monitored target 104, unique tower identifier, GNSS coordinates (latitude, longitude), and timestamps for when each respective GNSS coordinate has been determined. BWTD 106 may wirelessly communicate such messages to tower 110, which in turns sends the messages to monitoring center 112 via network 115, and in some examples one or more additional, intermediate networked devices (not shown in FIG. 1).

In accordance with techniques of this disclosure, a computing device (e.g., BWTD 106 and/or one or more server devices 114) may determine whether BWTD 106 is located on board an aircraft. In some examples, BWTD 106 may determine whether BWTD 106 is located onboard an aircraft based at least in part on data generated by one or more sensors of BWTD 106. In some examples, an accelerometer of BWTD 106 detects acceleration of an aircraft while the aircraft taxis from a gate to a runway, and down the runway during the takeoff maneuver. BWTD 106 may determine that BWTD 106 is located on board an aircraft by comparing the detected acceleration to a template acceleration pattern corresponding to an aircraft take-off. For example, the template acceleration pattern corresponding to an aircraft take-off may be characterized by a large initial acceleration in a horizontal plane over a first time-period (e.g., when a pilot initially engages a motor to generate thrust). The template acceleration pattern may include a relatively constant acceleration over a second time-period after the initial period of time (e.g., five, ten, thirty seconds, or more) that is indicative of an aircraft increasing speed during takeoff. In some examples, BWTD 106 determines that BWTD 106 is located on board an aircraft in response to determining that a portion of the acceleration data generated by an accelerometer of BWTD 106 corresponds to the shape of the template acceleration pattern.

In some examples, BWTD 106 determines whether BWTD 106 is on board an aircraft based at least in part on a non-cellular wireless network connection between BWTD 106 and a wireless communication device on board the aircraft. For example, BWTD 106 may receive a message (e.g., from monitoring center 112) indicating permitted travel information, such as flight information associated with a permitted flight (e.g., a flight number, airline, and/or flight dates and times). In some instances, the permitted flight information indicates a wireless communication device on board an aircraft flying the permitted flight. For instance, the permitted flight information may include a wireless network identifier (e.g., a network SSID on board the aircraft) or a networking device identifier (e.g., a MAC address of a networking device on board the aircraft) associated with the permitted flight.

In some instances, BWTD 106 may detect one or more wireless networks and may compare a network identifier (e.g., SSID) or device identifier (e.g., MAC address) associated with a detected wireless network to the received flight information (e.g., network identifier or networking device identifier associated with the permitted flight). For instance, BWTD 106 may determine that BWTD 106 is on board an aircraft in response to determining the network identifier (e.g., SSID) of an available network matches the network identifier of the expected network identifier associated with a permitted flight. Similarly, BWTD 106 may determine that BWTD 106 is on board an aircraft in response to determining that a device identifier (e.g., MAC address) corresponding to an available network matches the networking device identifier of the expected networking device associated with the permitted flight. In other words, BWTD 106 may determine that BWTD 106 is located on board an aircraft in response to determining that an available non-cellular wireless network corresponds to a predetermined non-cellular wireless network expected to be available on board an aircraft flying a permitted flight.

In response to determining that BWTD 106 is located on board an aircraft, BWTD 106 may disable the GNSS device of BWTD 106. For instance, the GNSS device may not be able to determine the GNSS coordinates of BWTD 106 when BWTD 106 is located on board an aircraft, such that BWTD 106 may disable the GNSS device while BWTD 106 is on board the aircraft. Disabling the GNSS device while BWTD 106 is located on board the aircraft may reduce the battery consumed by the GNSS device, thus potentially increasing the battery life of the BWTD 106.

BWTD 106 may refrain from generating alerts when BWTD 106 is located on board the aircraft. For instance, in response to determining that BWTD 106 is located on board the aircraft, BWTD 106 may temporarily refrain from generating alerts that indicate BWTD 106 cannot determine its GNSS coordinates using the GNSS device. In other words, BWTD 106 may refrain from alerting the monitored person 104, monitoring center 112, and/or alerting law enforcement personnel that BWTD 106 is not connected to enough GNSS satellites to determine its GNSS coordinates. By refraining from generating alerts indicating that BWTD 106 cannot determine its GNSS coordinates when BWTD 106 is located on board an aircraft, BWTD 106 may reduce the network traffic between BWTD 106 and monitoring center 112 and may reduce the processing performed by BWTD 106 and/or monitoring center 112. Refraining from generating alerts when BWTD 106 is located on board an aircraft may enable monitored person 104 to travel via vehicles that may prevent BWTD 106 from receiving signals from GNSS satellites and may reduce the number of false alerts. Reducing the number of alerts may also reduce the time and resources consumed by law enforcement personnel in supervising monitored persons.

While the techniques described herein are described in the context of determining whether a BWTD is located on board an aircraft, techniques of this disclosure may also be used to determine whether a BWTD is located within other permitted areas even if the BWTD is unable to determine its GNSS coordinates in that permitted area. For example, BWTD 106 may lose a connection to one or more GNSS satellites upon moving indoors, below ground, or any other location where satellite signals are obstructed by topography or man-made or naturally occurring structures. For instance, BWTD 106 may be unable to determine its GNSS coordinates when monitored person 104 is at his or her place of employment. In some scenarios, BWTD 106 may determine that BWTD 106 is located in a permitted area based on a network identifier of a wireless (e.g., WiFi®) network and/or a device identifier (e.g., MAC address) for a networking device (e.g., a router) at the place of employment of monitored person 106. Thus, BWTD 106 may refrain from generating alerts when BWTD 106 is located within a known, permitted area.

Figure 2:
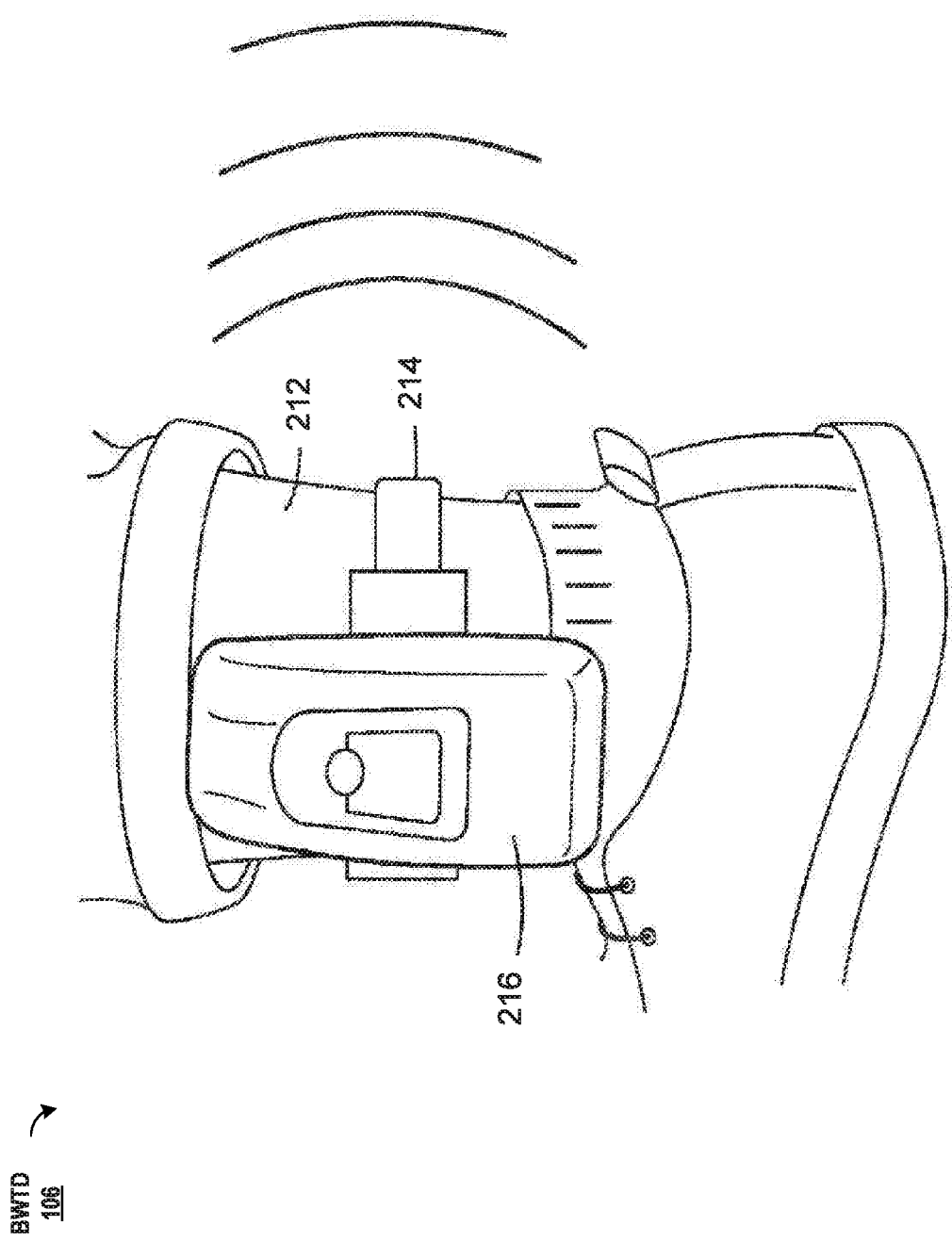
FIG. 2 is a perspective view of an example body-worn tracking device, in accordance with one or more aspects of the present disclosure.

FIG. 2 is a perspective view of an example BWTD, in accordance with one or more aspects of the present disclosure. BWTD 106 may be configured to implement various aspects of this disclosure. FIG. 2 illustrates only one particular example of BWTD 106, as shown in FIG. 1. Many other examples of BWTD 106 may be used in other instances. Other BWTDs may include different subsets of the components than those of the example of BWTD 106 shown in FIG. 2. As illustrated in FIG. 2, BWTD 106 may be attached to an ankle 212 of monitored target 104. Furthermore, as illustrated in FIG. 2, BWTD 106 includes a strap 214 and a housing 216. Housing 216 includes a variety of components such as one or more processors configured to perform the techniques described herein, one or more storage components for storing instructions executable by the processor along with data, one or more GNSS components, one or more sensors, and one or more communication units. The one or more communication units may enable BWTD 106 to communicate wirelessly with an external device.

Figure 3:
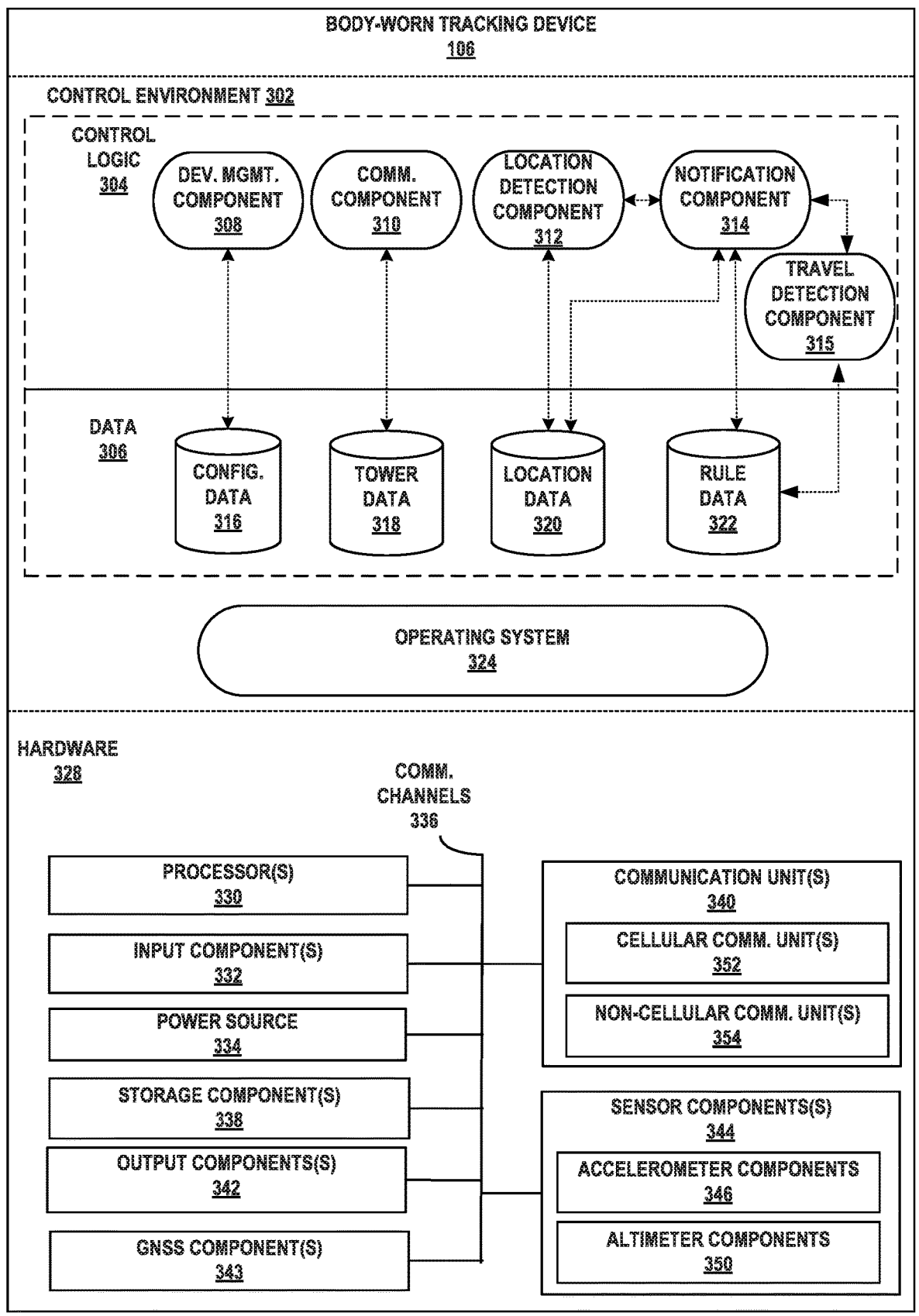
FIG. 3 is a block diagram illustrating example components of a body-worn tracking device, in accordance with one or more aspects of the present disclosure.

FIG. 3 is a block diagram illustrating example components of BWTD 106, in accordance with one or more aspects of the present disclosure. FIG. 3 illustrates only one particular example of BWTD 106, as shown in FIG. 1 or FIG. 2. Many other examples of BWTD 106 may be used in other instances and may include a subset of the components included in BWTD 106 or may include additional components not shown in FIG. 3. In some examples, the external housing (not shown) of BWTD 106 may have one or more attachment components (not shown), such as straps, fasteners, magnetic materials, adhesive materials or any other mechanism or material for attaching or associating with tracking device 106A with an object to be tracked.

As shown in the example of FIG. 3, BWTD 106 may be logically divided into control environment 302 and hardware 328. Hardware 328 may include one or more hardware components that provide an operating environment for components executing in control environment 302. Control environment may include control logic 304, data 308, and operating system 324, which may be operable by processors 330 to perform various functions described herein. In some instances, operating system 324 may operate with higher privileges than other components executing in control environment 302.

As shown in FIG. 3, hardware 328 includes one or more processors 330, input components 332, power source 334, storage components 338, communication units 340, output components 342, GNSS components 343, and sensor components 344. Processors 330, input components 332, power source 334, storage components 338, communication units 340, output components 342, GNSS components 343, and sensor components 344 may each be interconnected by one or more communication channels 336. Communication channels 336 may interconnect each of components 330, 332, 334, 338, 340, 342, 343, and 344 for inter-component communications (physically, communicatively, and/or operatively). In some examples, communication channels 336 may include a hardware bus, a network connection, one or more inter-process communication data structures, or any other components for communicating data between hardware and/or software.

One or more processors 330 may implement functionality and/or execute instructions within BWTD 106. For example, processors 330 on BWTD 106 may receive and execute instructions stored by storage components 338 that provide the functionality of components included in control environment 302. These instructions executed by processors 330 may cause BWTD 106 to store and/or modify information within storage components 338 during program execution. Processors 330 may execute instructions of components in control environment 302 to perform one or more operations in accordance with techniques of this disclosure. That is, components included in control environment 302 may be operable by processors 330 to perform various functions described herein.

One or more input components 332 of BWTD 106 may receive input. Examples of input are tactile, audio, kinetic, and optical input, to name only a few examples. Input components 332 of BWTD 106, in one example, include a voice responsive system, video camera, buttons, control pad, microphone or any other type of device for detecting input from a human or machine. In some examples, input component 332 may be a presence-sensitive input component, which may include a presence-sensitive screen, touch-sensitive screen, etc.

As shown in FIG. 3, BWTD 106 may include a power source 334. In some examples, power source 334 is a battery. Power source 334 provides power to one or more components of BWTD 106. Examples of power source 334 include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 334 may have a limited capacity (e.g., 1000-3000 mAh).

One or more storage components 338 within BWTD 106 may store information for processing during operation of BWTD 106. In some examples, storage components 338 include a temporary memory, meaning that a primary purpose of storage components 338 is not long-term storage. Storage components 338 on BWTD 106 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage components 338, in some examples, also include one or more computer-readable storage media. Storage components 338 may be configured to store larger amounts of information than volatile memory. Storage components 338 may further be configured for long-term storage of information as non-volatile memory space and retain information after activate/off cycles. Examples of non-volatile memories include magnetic hard discs, flash memories, or forms of electrically programmable memories (EPROM) or electrically erasable and programmable (EEPROM) memories. Storage components 338 may store program instructions and/or data associated with components included in control environment 302.

One or more output components 342 of BWTD 106 generate output. Examples of output are tactile output (e.g., haptic output, vibratory output), audio output, and video output. Output components 342 of BWTD 106, in some examples, include a display screen, a presence-sensitive screen, a sound card, a video graphics adapter card, a speaker, a liquid crystal display (LCD), or another type of device for generating output to a human or machine. In some examples, output components 342 are integrated with BWTD 106 and physically connected to the external packaging of BWTD 106. In other examples, output components 342 are physically external to and separate from BWTD 106, but are operably coupled to BWTD 106 via wired or wireless communication.

One or more communication units 340 of BWTD 106 communicate with external devices by transmitting and/or receiving data. For example, BWTD 106 may use communication units 340 to transmit and/or receive radio signals on a radio network such as a cellular radio network or non-cellular radio network. Communication units 340 may include cellular communication units 352 and non-cellular communication units 354. Examples of cellular communication units 352 include 2G, 3G, 4G, CDMA, GSM, and LTE radios. Examples of non-cellular communication units 354 include a network interface card (e.g. such as an Ethernet card), an optical transceiver, a radio frequency transceiver, or any other type of device that can send and/or receive information. Other examples of non-cellular communication units 354 include Bluetooth® and Wi-Fi® radios as well as Universal Serial Bus (USB) controllers and the like.

GNSS components 343 receive satellite signals from GNSS satellites (e.g., satellites 108 (FIG. 1)). Location detection component 312 may determine, based on the received satellite signals, coordinates corresponding to a location of BWTD 106 at a particular point in time.

In some examples, sensor components 344 include a plurality of sensing components, such as accelerometer components 346, gyroscope components 348, and altimeter components 350. Accelerometer components 346 may generate data indicative of the acceleration of BWTD 106 in at least one plane. In some examples, accelerometer components 346 include a 3-axis accelerometer that detects acceleration in 3-dimensions and generates data indicative of the acceleration in each of the 3-dimensions. Gyroscope components 348 may generate data indicative of a change in the orientation (e.g., direction) of BWTD 106 in one or more of the 3-dimensions. As illustrated in FIG. 3, sensor components 344 may include altimeter components 350. Altimeter components 350 may detect the air-pressure and may generate data indicative of the detected air-pressure.

In the example of FIG. 3, control logic 304 executes in control environment 302. Control logic 304 may include but is not limited to: a device management component (DMC) 308, a communication component 310, a location detection component 312, a notification component 314, and a travel detection component 315. In some examples, BWTD 106 may run a set, subset, or superset of functionality included in control logic 304. Data 306 may include one or more data stores. A data store may store data in structured or unstructured form. Example data stores may be any one or more of a relational database management system, online analytical processing database, table, or any other suitable structure for storing data. In the example of FIG. 3, data 306 includes configuration data 316, tower data 318, location data 320, and rule data 322. Storage components 338 may store data 306.

Components such as DMC 308, communication component 310, location detection component 312, notification component 314, and travel detection component 315 may perform operations described herein using software, hardware, firmware, or a mixture of both hardware, software, and firmware residing in and executing on BWTD 106. In some examples, processors 330 of BWTD 106 may execute various components when embodied in software to perform the functionality described in this disclosure. Processors 330 may execute any of such components as or within a virtual machine, user space application, operating system or any other operating environment executing on underlying hardware.

Configuration data 316 may include one or more of: a unique identifier of BWTD 106, a unique identifier of the monitored person to which BWTD 106 is assigned, and/or any other properties or parameters that control or change the operation of tracking device 106A. Tower data 318 may include records, tuples or sets, wherein each record, tuple or set specifies one or more of: a unique identifier of a particular tower, a latitude and longitude of BWTD 106 when BWTD 106 detected or initiated a communication session with the particular tower, a signal strength for the tower when BWTD 106 detected or initiated a communication session with the particular tower, a directional heading of BWTD 106 when BWTD 106 detected or initiated a communication session with the particular tower, and/or a timestamp when BWTD 106 detected or initiated a communication session with the particular tower.

Location data 320 may include records, tuples or sets, wherein each record, tuple or set specifies one or more of: a unique identifier of BWTD 106 and/or a monitored person wearing BWTD 106, GNSS coordinates (e.g., latitude, longitude), a timestamp when the GNSS coordinates were determined, GNSS signal strength when the GNSS coordinates were determined, signal strength of a tower when the GNSS coordinates were determined, and/or a directional heading of BWTD 106 when the GNSS coordinates were determined.

Rule data 322 may include permitted flight information, such as the airline, flight number, flight destination, expected departure date/time, expected arrival date/time, expected travel duration, or other flight information corresponding to a flight (or other form of permitted transportation) that a monitored target is permitted to travel upon. Rule data 322 may include permitted flight information for multiple travel legs. For instance, rule data 322 may include flight information for a flight from a city of origin to a destination city, a flight from a city of origin to a temporary destination (e.g., due to a flight layover) and a flight from the temporary destination to a final destination), and/or a return flight from the destination to the city of origin. Rule data 322 may indicate one or more aircraft corresponding to a permitted flight. For instance, rule data 322 may include an aircraft registration number (e.g., a unique aircraft identifier) associated with a particular flight code (or flight number), aircraft manufacturer, aircraft model, etc. In some instances, rule data 322 includes networking information (e.g., a wireless network identifier, such as an SSID; or a networking device identifier, such as a MAC address) corresponding to a wireless network expected to be available on board the aircraft flying a permitted flight. In some examples, rule data 322 may include updated information corresponding to a permitted flight. For example, an aircraft designated to fly a permitted flight may be temporarily unavailable prior to takeoff (e.g., due to unplanned maintenance) or an aircraft may be re-routed mid-flight (e.g., due to weather) such that BWTD 106 may receive updated flight information and may receive flight information for the permitted flight.

In operation, DMC 308 may initially be configured with configuration data 316. For instance, DMC 308 may be programmed, from an external computing device, with a unique identifier for BWTD 106 and/or a unique identifier of the monitored person associated with or assigned to BWTD 106. Once BWTD 106 has been configured with configuration data 316, the monitored person may move about one or more geographic regions. Additionally, DMC 308 may write data to storage components 338 that is received from monitoring center 112 or other computing devices. Data may include restricted regions and/or restricted locations, configuration data to configure one or more components of BWTD 106, information that uniquely identifies BWTD 106 and/or monitored target 104 that is wearing BWTD 106, or any other suitable information.

Communication component 310 maintains communication between BWTD 106 and monitoring center 112. Communication component 310 may initiate, manage, and terminate communication sessions with towers that provide cellular network infrastructure via cellular communication units 352. For example, as BWTD 106 moves to different geographic regions, communication component 310 may initiate communication sessions with different towers in the different regions, where a tower may be a Base Station Transceiver in a wireless communication network, such as a cellular network. Examples of such cellular networks may include a set of one or more geographically dispersed towers with radios, antennas and/or other communications components that provide for data communication with BWTD 106 using one or more protocols such as 2G, 3G, 4G, Long-Term Evolution (LTE), or any other suitable protocol. Cellular network infrastructure may provide a wireless network for data communication to and from BWTD 106 over a geographically distributed area. In some examples, cellular network infrastructure may be owned and operated by a third-party, wireless or cellular carrier provider. Communication component 310 may manage communications with monitoring center 112 via non-cellular communication units 354. For example, communication component 310 may send message to, and receive messages from, monitoring center 112 via a wired or wireless work (e.g., Wi-Fi®).

Location detection component 312 may determine the location (e.g., GNSS coordinates) of BWTD 106 based on data received from GNSS components 343. For instance, GNSS components 343 may receive GNSS signals from a plurality of GNSS satellites (e.g., satellites 108 in FIG. 1). The GNSS signals received from each GNSS satellite may include data indicating a position of a respective GNSS satellite and a time at which the respective GNSS satellite sent the GNSS signal. Location detection component 312 may determine the latitude and longitude of BWTD 106 at a particular point time based on the data received from the GNSS satellites. Location detection component 312 may determine the latitude and longitude on a periodic basis according to an interval that may be included in configuration data 316. The time interval may be programmed by a user, dynamically changed (e.g., based on one or more detected or determined events) or hard-coded. At a point in time (e.g., when a time interval has elapsed), upon determining the latitude and longitude, location detection component 312 may generate and store a record, tuple or set that specifies one or more of: a unique identifier of BWTD 106 and/or monitored person wearing BWTD 106, GNSS coordinates (latitude, longitude), a timestamp when the GNSS coordinates (latitude, longitude) were determined, GNSS signal strength when the GNSS coordinates (latitude, longitude) were determined, signal strength of a tower when the GNSS coordinates (latitude, longitude) were determined, and/or a directional heading of BWTD 106 when the GNSS coordinates (latitude, longitude) were determined. Location detection component 312 may send location data 320 to monitoring center 112 of FIG. 1 in real-time, periodically, or asynchronously.

In some circumstances, location detection component 312 is unable to determine the current location of BWTD 106. For example, GNSS components 343 may be unable to receive GNSS signals from a sufficient number of satellites 108 (FIG. 1) such that location detection component 312 is unable to determine the geospatial location (e.g., GNSS coordinates) of BWTD 106. For instance, GNSS components 343 may be unable to detect GNSS signals from a sufficient number of GNSS satellites when BWTD 106 enters a building or enters a geographical area obstructed by manmade or naturally occurring environmental features.

Notification component 314 may receive notifications from external computing devices such as monitoring center 112 and/or user devices 116, as shown in FIG. 1. Notification component 314 may generate and send notifications to one or more external computing devices such as monitoring center 112 and/or user devices 116.

Notifications generated by notification component 314 may be based on input from travel detection component 315 and/or location detection component 312. In some examples, if location detection component 312 is unable to determine the current GNSS coordinates of BWTD 106, notification component 312 may generate a notification indicating that the current coordinates of BWTD 106 are unknown and may send the notification to a computing device 107 associated with monitored target 104 and/or monitoring center 112.

In accordance with techniques of this disclosure, BWTD 106 may refrain from generating notifications or alerts in response to determining that BWTD 106 is on board a permitted vehicle. For example, travel detection component 315 may determine whether BWTD 106 is located on board an aircraft and may cause notification component 314 to temporarily refrain from outputting notifications in response to determining that BWTD 106 is on board an aircraft (e.g., even if location detection component 312 is unable to determine the current GNSS coordinates of BWTD 106).

BWTD 106 may determine whether BWTD 106 is located on board an aircraft based on one or more sensor components 344. In some examples, accelerometer components 346 detects acceleration of the aircraft during the takeoff maneuver. Travel detection component 315 may determine that BWTD 106 is located on board an aircraft by comparing the detected acceleration to a template acceleration pattern corresponding to an aircraft take-off. In some examples, travel detection component 315 determines that BWTD 106 is located on board an aircraft in response to determining that at least a portion of the acceleration data generated by accelerometer components 346 corresponds to the shape of the template acceleration pattern.

In some examples, travel detection component 315 determines whether BWTD 106 is on an aircraft based at least in part on the speed of BWTD 106. For instance, travel detection component 315 may integrate the acceleration data over a period of time to determine the speed of BWTD 106. In some instances, travel detection component 315 may compare the speed of BWTD 106 to a threshold speed. The threshold speed may correspond to an aircraft takeoff speed (e.g., approximately 150 mph or 240 km/h for a commercial jetliner). In some instances, the threshold speed may correspond to an aircraft cruising speed (e.g., approximately 500 mph or 800 km/h, or other speed fast enough that is not likely achieved by other means of accelerating a BWTD, such as an automobile). Travel detection component 315 may determine that BWTD 106 is located on board an aircraft in response to determining that the speed of BWTD 106 satisfies (e.g., is greater than or equal to) the threshold speed.

Travel detection component 315 may determine whether BWTD 106 is on board an aircraft based at least in part on the air pressure around BWTD 106. For example, altimeter components 350 may generate pressure data indicative of the air pressure. Travel detection component 315 may compare the pressure of the air around BWTD 106 to the ground air pressure at the last known location of BWTD 106. For instance, the air pressure at sea level may be approximately 1 atmosphere ("ATM"), which is approximately 101 kilopascals (kPa) or approximately 14.7 PSI. In contrast, an aircraft at cruising altitude may be pressurized between approximately 11 and approximately 12 PSI (approximately 0.75 to approximately 0.80 ATM). Thus, travel detection component 315 may determine that BWTD 106 is on board an aircraft in response to detecting a change in air pressure over a predefined period of time (e.g., 5 minutes, 15 minutes, 30 minutes, or other period of time). In other words, travel detection component 315 may determine that BWTD 106 is on board an aircraft in response to determining that the air pressure is less than or equal to a threshold air pressure within a particular amount of time. In some instances, travel detection component 315 determine that BWTD 106 is on board an aircraft in response to determining that the air pressure has dropped by at least a threshold amount within a particular amount of time.

In some examples, travel detection component 315 may determine whether BWTD 106 is located on board an aircraft based at least in part on a non-cellular wireless network connection between BWTD 106 and a wireless communication device (e.g., on board the aircraft). For example, rule data 322 may include information associated with non-cellular wireless network expected to be available on an aircraft for a permitted flight and travel detection component 315 may compare the information associated with the expected wireless network to information associated with one or more available wireless networks. The information associated with the wireless network expected to be available on an aircraft flying a permitted flight may include a device identifier (e.g., MAC address) of a networking device expected to be on board the aircraft. In some examples, travel detection component 315 may determine that BWTD 106 is located on board a permitted aircraft in response to determining that the MAC address of a networking device that broadcasts an available wireless network matches the MAC address of the networking device expected on board the permitted aircraft.

In some examples, the information associated with a non-cellular wireless network expected to be available on an aircraft flying a permitted flight includes a network identifier (e.g., SSID) of a wireless network expected on board the aircraft. Travel detection component 315 may compare the network identifiers of one or more available wireless networks to the network identifier of the network expected to be available on the aircraft. In some instances, travel detection component 315 may determine that BWTD 106 is on board a permitted aircraft in response to determining that the SSID of an available network matches the SSID of a network expected to be on the permitted aircraft. In other words, travel detection component 315 may determine that BWTD 106 is on board an aircraft if the SSID of an available WiFi® network matches the predetermined SSID of the WiFi® network expected to be available on the aircraft flying a permitted flight.

Travel detection component 315 may determine whether BWTD 106 is located on board the correct aircraft (e.g., an aircraft flying a permitted flight, also referred to as a permitted aircraft). In some examples, travel detection component 315 determines whether BWTD 106 is on board a permitted aircraft based on information received from the aircraft. For example, responsive to connecting to a wireless network, communication component 310 may request flight information (e.g., flight number, destination city, or other flight information) for the flight from a computing device (e.g., an in-flight entertainment system) on board the aircraft. Communication component 310 may receive the flight information for the flight and travel detection component 315 may compare the received flight information to the flight information for the permitted flight. For instance, travel detection component 315 may compare the flight code (also referred to as flight number) received from the aircraft's on board computing and the current date to the flight code of the permitted flight and permitted travel date. Travel detection component 315 may determine that BWTD 106 is on board a permitted flight in response to determining that the flight information received from the computing system on board the aircraft corresponds to the flight information for the permitted flight. In response to determining that BWTD 106 is on board an aircraft, notification component 314 may temporarily refrain from outputting notifications indicating that the current location (e.g., GNSS coordinates) of BWTD 106 cannot be determined. For example, BWTD 106 may refrain from outputting alerts (e.g., visual, audible, tactile) alerts to monitored user 104 or from sending alerts to monitoring center 112 and/or user devices 116 utilized by monitoring users 118.

In some examples, BWTD 106 may receive updated flight information associated with a permitted flight. BWTD 106 may receive the updated flight information prior to boarding (e.g. while monitored target 104 is at the airport), after monitored target 104 boards the permitted aircraft but before takeoff, or after takeoff but before landing. In some scenarios, the updated flight information may indicate a change in the a aircraft assigned to fly the permitted flight (e.g., due to unscheduled maintenance on the aircraft originally assigned to fly the permitted flight). For example, the updated flight information may include a registration number of a second aircraft, networking information (e.g., network identifier or networking device identifier) for a second aircraft, etc. In some instances, the updated flight information may indicate a change in the flight (e.g., due to weather). For instance, the updated flight information may include an updated departure date and/or time, departure airport, destination date and/or time, destination airport and/or city, etc. For instance, BWTD 106 may receive updated flight information via the wireless non-cellular network on board the aircraft indicating a different destination airport (e.g., if the aircraft is re-routed to a different city due to weather near the original destination).

In some examples, travel detection component 315 may command BWTD 106 to operate in an "airplane mode" in response to determining that BWTD 106 is located on board the correct, permitted aircraft (e.g., an aircraft flying a permitted flight). For example, in the airplane mode, one or more of communication units 340 may be disabled, turned-off, or may be otherwise operating in a reduced-power state, such that the one or more disabled communication units do not transmit or receive messages. For instance, travel detection component 315 may disable a cellular radio component and/or GNSS components 343 in response to determining that BWTD 106 is located on board a permitted aircraft. Disabling one or more of communication units 340 may reduce the amount of battery power consumed by the one or more disabled communication units when BWTD 106 is on a flight.

In some examples, travel detection component 315 causes BWTD 106A to enter the airplane mode in response to receiving a message from monitoring center 112 indicating that non-cellular wireless communication between BWTD 106 and monitoring center 112 has been established. For example, an internet provider that provides internet access to the network on board the aircraft may request network access credentials before providing BWTD 106 with access to the internet, such that BWTD 106 may be unable to communicate with monitoring center 112 via the aircraft's non-cellular wireless network until the internet provider has granted BWTD 106 access to the internet. In some instances, BWTD 106 may receive the network access credentials from monitoring center 112 and/or computing device 107. Responsive to BWTD 106 connecting to the network, BWTD 106 may retrieve the network access credentials from a volatile or non-volatile memory device (e.g., storage components 338) and may send the network access credentials to the network. BWTD 106 may receive a message from the internet provider indicating whether the network access credentials supplied by BWTD 106 are correct. In response to receiving a message indicating that the network access credentials are correct, BWTD 106 may communicate with monitoring center 112 via the non-cellular wireless network on board the aircraft. Responsive to receiving a message from message from monitoring center 112 via the non-cellular wireless network, BWTD 106 may disable the GNSS components 343 and/or cellular communication unit 352. In some instances, BWTD 106 may disable GNSS components 343 and/or cellular communication unit 352 in response to receiving permission from monitoring center 112.

Travel detection component 315 may re-enable one or more of communication units 340 and/or GNSS components 343 in response to determining that the permitted flight is complete (e.g., the aircraft has landed). In some examples, travel detection component 315 determines that the flight is complete based on sensor data generated by sensor components 344. For example, travel detection component may receive sensor data from accelerometer components 346 and may determine that the aircraft has landed in a similar manner as described above for determining when the aircraft takes off. Travel detection component 315 may determine that the permitted flight is complete based on information received from the aircraft's on board computing system (e.g., an in-flight entertainment system) that the aircraft has landed. For instance, BWTD 106 may receive messages from the on board computing system that indicate the position or location of the aircraft while BWTD 106 is connected to the aircraft wireless network. In some instances, BWTD 106 sends messages to monitoring center 112 indicating the current position of the aircraft during the flight. Responsive to receiving a message from the computing system on board the aircraft that indicates the aircraft has landed or the aircraft has arrived at its destination, travel detection component 315 may determine that the permitted flight is complete.

In some examples, BWTD 106 may determine that the permitted flight is complete in response losing a connection to the wireless network on board the aircraft. For example, upon landing, monitored person 104 may disembark the permitted aircraft such that BWTD 106 is no longer communicatively coupled to the wireless network on board the aircraft. In some instances, travel detection component 315 determines that the permitted flight is complete in response to losing a connection to the wireless network on board the aircraft for at least a threshold amount of time (e.g., one minute, five minutes, thirty minutes, etc.).

Travel detection component 315 may command BWTD 106 to cease operating in the airplane mode and resume a normal mode of operation in response to determining that the permitted flight is complete. For example, travel detection component 315 may re-enable one or more of communication units 340 and/or GNSS components 343 in response to determining that the permitted flight is complete. Similarly, travel detection component may re-enable notification component 314 in response to determining that the permitted flight is complete. As a result, notification component 314 may output notifications in response to location detection components 312 determining that the current GNSS coordinates of BWTD 106 cannot be determined using the GNSS components 343. In some examples, notification component 314 may generate and send notifications (e.g., via communication components 310) to one or more external computing devices such as monitoring center 112 and/or computing device 107 of FIG. 1. For example, the notification may include a message indicating that the GNSS coordinates of BWTD 106 cannot be determined and/or that BWTD 106 is no longer on board the permitted aircraft. Additionally or alternatively, the notification may include flight information (e.g., arrival city and time). In some scenarios, notification component 314 may send a command to one or more of output components 342 to output an alert. Responsive to receiving the command to output an alert, one or more of output components 342 may output an alert (e.g., haptic, audio, or visual feedback) that indicates the person wearing BWTD 106A should proceed to an area where BWTD 106 can receive GNSS signals from enough satellites to determine its current GNSS coordinates.

FIG. 4 is a block diagram illustrating example components of server device 114A, in accordance with one or more aspects of the present disclosure. FIG. 4 illustrates only one particular example of server device 114A in monitoring center 112, as shown in FIG. 1. Many other examples of server device 114A may be used in other instances and may include a subset of the components included in example server device 114A or may include additional components not shown in FIG. 4. In some examples, server device 114A may be a server, tablet computing device, smartphone, wrist- or head-worn computing device, laptop, desktop computing device, or any other computing device that may run a set, subset, or superset of functionality included in application 428.

As shown in the example of FIG. 4, server device 114A may be logically divided into user space 402, kernel space 404, and hardware 406. Hardware 406 may include one or more hardware components that provide an operating environment for components executing in user space 402 and kernel space 404. User space 402 and kernel space 404 may represent different sections or segmentations of memory, where kernel space 404 provides higher privileges to processes and threads than user space 402. For instance, kernel space 404 may include operating system 420, which operates with higher privileges than components executing in user space 402.

As shown in FIG. 4, hardware 406 includes one or more processors 408, input components 410, storage components 412, communication units 414, and output components 416. Processors 408, input components 410, storage components 412, communication units 414, and output components 416 may each be interconnected by one or more communication channels 418. Communication channels 418 may interconnect each of the components 408, 410, 412, 414, and 416 for inter-component communications (physically, communicatively, and/or operatively). In some examples, communication channels 418 may include a hardware bus, a network connection, one or more inter-process communication data structures, or any other components for communicating data between hardware and/or software.

One or more processors 408 may implement functionality and/or execute instructions within server device 114A. For example, processors 408 on server device 114A may receive and execute instructions stored by storage components 412 that provide the functionality of components included in kernel space 404 and user space 402. These instructions executed by processors 408 may cause server device 114A to store and/or modify information, within storage components 412 during program execution. Processors 408 may execute instructions of components in kernel space 404 and user space 402 to perform one or more operations in accordance with techniques of this disclosure. That is, components included in user space 402 and kernel space 404 may be operable by processors 408 to perform various functions described herein.

One or more input components 410 of server device 114A may receive input. Examples of input are tactile, audio, kinetic, and optical input, to name only a few examples. Input components 410 of server device 114A, in one example, include a mouse, keyboard, voice responsive system, video camera, buttons, control pad, microphone or any other type of device for detecting input from a human or machine. In some examples, input component 410 may be a presence-sensitive input component, which may include a presence-sensitive screen, touch-sensitive screen, etc.

One or more output components 416 of server device 114A may generate output. Examples of output are tactile, audio, and video output. Output components 416 of server device 114A, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output.

Output components 416 may be integrated with server device 114A in some examples. In other examples, output components 416 may be physically external to and separate from server device 114A, but may be operably coupled to server device 114A via wired or wireless communication. An output component may be a built-in component of server device 114A located within and physically connected to the external packaging of server device 114A (e.g., a screen on a mobile phone). In another example, an output component, such as a presence-sensitive screen, may be an external component of server device 114A located outside and physically separated from the packaging of server device 114A (e.g., a monitor, a projector, etc. that shares a wired and/or wireless data path with a tablet computer). Output components 416 may provide haptic, vibratory or other tactile output.

One or more communication units 414 of server device 114A may communicate with external devices by transmitting and/or receiving data. For example, server device 114A may use communication units 414 to transmit and/or receive radio signals on a radio network such as a cellular radio network. Examples of communication units 414 include a network interface card (e.g. such as an Ethernet card), an optical transceiver, a radio frequency transceiver, or any other type of device that can send and/or receive information. Other examples of communication units 414 may include Bluetooth®, 3G, 4G, and Wi-Fi® radios found in mobile devices as well as Universal Serial Bus (USB) controllers and the like.

One or more storage components 412 within server device 114A may store information for processing during operation of server device 114A. In some examples, storage device 412 is a temporary memory, meaning that a primary purpose of storage device 412 is not long-term storage. Storage components 412 on server device 114A may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage components 412, in some examples, also include one or more computer-readable storage media. Storage components 412 may be configured to store larger amounts of information than volatile memory. Storage components 412 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage components 412 may store program instructions and/or data associated with components included in user space 402 and/or kernel space 404.

As shown in FIG. 4, application 428 executes in user space 402 of server device 114A. Application 428 may be logically divided into presentation layer 422, application layer 424, and data layer 426. Presentation layer 422 may include user interface (UI) component 425, which generates and renders user interfaces of application 428. Application layer 424 may include location management component (LMC) 427, rule enforcement component (REC) 429, and notification component 430.

Data layer 426 may include one or more data stores. A data store may store data in structure or unstructured form. Example data stores may be any one or more of a relational database management system, online analytical processing database, table, or any other suitable structure for storing data. Monitored person data 434 may include information descriptive of monitored persons and/or monitoring users. Example data, may include unique identifier for monitored person or user, name, address, phone number, notes, or any other descriptive information of a monitored person or monitored person, such as a type of offense, a degree of offense (e.g., a legal degree of offense, such as second degree battery), or the like.

Location data 436 may include GNSS locations of BWTDs and other data associated with the GNSS locations. For instance, a record or other instance of location data in location data 436 may include, but is not limited to, any one or more of: unique identifier of BWTD and/or monitored person wearing BWTD, timestamp, GNSS coordinates (latitude, longitude), GNSS signal strength, signal strength of cellular tower, and directional heading of BWTD, speed at which a BWTD is traveling, whether a BWTD is at rest, an ambient temperature in which a BWTD is located, whether a BWTD is in motion without a GNSS signal, or the like. The data included in a record or other instance of location data in location data 436 may be a tuple or set of data sent by a BWTD to monitoring center 112, as described in FIG. 1.

Data layer 426 also includes monitoring rules data 438. Monitoring rules data 438 may include data that define, one or more of: a restricted area, a permissible area, a time period for permitted travel with respect to a restricted/permissible area, permissible/restricted users who can or cannot be within a threshold distance of the monitored person, grace periods, or any other property, rule, condition, to name only a few examples. In some examples, monitoring rules 438 defines permitted travel (e.g., flight) information, such as permitted modes of travel, permitted travel dates/times, permitted destinations, or other information indicating when, where, or how a monitored target is permitted to travel. For example, monitoring rules 438 may include information indicating an airline and flight number of a flight monitored target 104 is permitted to fly upon, a permitted departure city (also referred to as a city of origin), a permitted departure airport, a permitted destination city, and/or a permitted destination airport. In some instances, monitoring rules 438 defines a network identifier (e.g., SSID) or networking device identifier (e.g., MAC address) corresponding to a wireless network expected to be available on board a vehicle (e.g., aircraft) upon which the monitored target is permitted to travel.

In operation, BWTD 106 may be attached and assigned to monitored target 104. LMC 427 may receive a unique identifier of BWTD 106 and/or a unique identifier of monitored target 104. LMC 427 may store data defining an association between the unique identifier of BWTD 106 and the unique identifier of monitored target 104. As monitored target 104 moves within one or more different geographic regions, LMC 427 may receive location data from BWTD 106 including, but not limited to: a unique identifier of BWTD 106 and/or monitored person wearing BWTD 106, GNSS coordinates (latitude, longitude), a timestamp when the GNSS coordinates (latitude, longitude) were determined, GNSS signal strength when the GNSS coordinates (latitude, longitude) were determined, signal strength of a tower when the GNSS coordinates (latitude, longitude) were determined, and/or a directional heading of BWTD 106 when the GNSS coordinates (latitude, longitude) were determined. In some scenarios, location data 436 may also include a timestamp when GNSS coordinates of BWTD 106 were not able to be determined and the last known location of BWTD 106. In these scenarios, location data may also include motion data generated by one or more sensor components 344 of FIG. 3, and/or a net distance and net direction from the last known location of BWTD 106. LMC 427 may store such location data within location data 436.

REC 429 may determine whether any other property, rule, condition of monitoring rules data 438 is satisfied, and which may include data that defines, one or more of: a restricted area, a permissible area, a time period for permitted travel with respect to a restricted/permissible area, permissible/restricted users who can or cannot be within a threshold distance of the monitored person, or any other property, rule, condition. For instance, REC 429 may determine whether any other property, rule, condition is satisfied based on receiving one or more of GNSS locations from LMC 427, location data 436, and monitoring rules data 438.

Notification component 430 generate alerts. In some examples, an alert indicates that monitored target 104 is potentially at an unauthorized location or that BWTD 106 is unable to determine the GNSS coordinates of monitored target 104. For example, notification component 430 may send notifications (or messages) to computing devices external to server device 114A that cause such computing devices to output alerts, which may be visual, audio, haptic or any other type of discernable feedback. In this way, violations, statuses, or any other information may be communicated to devices of monitored persons and monitoring users. In some examples, events that cause notifications or messages to be sent by notification component 430 may also be logged by LMC 427, REC 429, and/or notification component 430 in monitored person data 434.

In some examples, UI component 425 acts as an intermediary between various components and modules of server device 114A to process and send input detected by input devices to other components and modules, and generate output from other components and modules that may be presented at one or more output devices. For instance, UI component 425 may generate one or more user interfaces for display, which may include data and/or graphical representations of maps, alerts, reports, or other communications as described in this disclosure.

While BWTD 106 is described in FIGS. 1-3 as determining whether BWTD 106 is located on board a permitted vehicle, according to some aspects of this disclosure, server device 114A determines whether BWTD 106 is located on board a permitted vehicle. For example, as illustrated in FIG. 4, application layer 424 of server device 114A includes travel detection component 432. In general, travel detection component 432 may enable server device 114A to determine whether WTD 106 is located on board an aircraft and if so, determine whether the aircraft is a permitted aircraft. In some instances, a permitted aircraft is an aircraft associated with a flight the monitored target 104 is permitted to travel upon. In other words, the permitted aircraft may be an aircraft assigned to fly a flight the monitored target is permitted to take.

Travel detection component 432 may determine whether BWTD 106 is located on board an aircraft based at least in part on a non-cellular wireless network connection between BWTD 106 and a wireless communication device (e.g., on board the aircraft). For example, server device 114A may receive a message from BWTD 106 via a non-cellular wireless network and may determine whether the non-cellular wireless network corresponds to a non-cellular wireless network expected on board an aircraft flying the permitted flight. For instance, server device 114A may receive a message that indicates the network identifier (e.g., SSID) of the non-cellular wireless network to which BWTD 106 is communicatively coupled, and may compare the network identifier to the network identifier of a network expected to be available on the aircraft flying the permitted flight. In some examples, travel detection component 432 may determine that BWTD 106 is on board an aircraft in response to determining that the network identifier of the non-cellular wireless network to which BWTD 106 is communicatively coupled corresponds to the network identifier of the network expected to be available on the permitted flight.

Travel detection component 432 may determine whether BWTD 106 is on board the correct aircraft (e.g., an aircraft flying a permitted flight, also referred to as the permitted aircraft) based on the device identifier of the wireless networking device to which BWTD 106 is communicatively coupled. For instance, sever device 114A may receive an indication of the MAC address of the networking device to which the BWTD 106 is coupled and may compare the received MAC address to the MAC address for a networking device on board the permitted flight. In some examples, travel detection component 432 determine that BWTD 106 is on board a permitted aircraft in response to determining that the networking device identifier of the non-cellular networking device to which BWTD 106 is communicatively coupled corresponds to the device identifier of a networking device expected to be available on the permitted flight.

In some examples, travel detection component 432 may determine whether BWTD 106 is located on board the correct, permitted aircraft based on information received from the aircraft. For example, responsive to BWTD 106 connecting to a non-cellular wireless network of an aircraft, server device 114A may receive a message that includes flight information (e.g., flight number, destination city, or other flight information) for the aircraft. For instance, BWTD 106 may query a computer on board the aircraft (e.g., an in-flight entertainment system) of the aircraft for the flight information and may send the flight information to server device 114A. Server device 114A may receive the flight information for the aircraft and may compare the received flight information to the flight information for the permitted flight. In some examples, travel detection component 432 may determine whether BWTD 106 is on board a permitted flight in based on a comparison of the received flight information and the flight information for the permitted flight. For instance, travel detection component 432 may compare the flight code and the current date to the flight code of the permitted flight and permitted travel date. Travel detection component 432 may determine that BWTD 106 is on board a permitted flight in response to determining that the flight information received from the on board computer corresponds to the flight information for the permitted flight.

Travel detection component 432 may send a message to BWTD 106 enabling or permitting BWTD 106 to operate in an "airplane mode" in response to determining that BWTD 106 is located on board a permitted flight. For example, travel detection component 432 may send a message to BWTD 106 via a communication unit 414 instructing BWTD 106 to place cellular communication units 352 and/or GNSS components 343 into a low power state (e.g., turned off, or using relatively less power than during normal operation), which may reduce the amount of power consumed by BWTD 106 during the permitted flight.

Travel detection component 432 may track BWTD 106 and/or the permitted aircraft during the permitted flight. For example, during a permitted flight, server device 114 may receive messages from BWTD 106 and/or the permitted aircraft. The messages may indicate the flight status (e.g., waiting to depart, in-flight, arrived, etc.), location of the permitted aircraft, etc. In some examples, notification component 430 may refrain from outputting notifications or alerts while BWTD 106 is on board a permitted flight. For example, while BWTD 106 may not receive GNSS signals from a sufficient number of GNSS satellites to determine its GNSS coordinates during the flight, notification component 430 of server device 114A may refrain from outputting an alert indicating BWTD 106 indicating the GNSS coordinates are unavailable in response to determining that BWTD 106 is located on board a permitted flight. For instance, notification component 430 may refrain from sending alerts to user devices 116 utilized by monitoring users 118 that indicate the current location of BTWD 106 is unavailable.

In some examples, travel detection component 432 determines whether the permitted flight is complete (e.g., has landed, is at the gate, etc.). Travel detection component 432 may determine that the permitted aircraft is complete based on received flight information. For example, the received flight information may indicate the current location of the aircraft and travel detection component 432 may determine that the current location of the aircraft corresponds to the destination of the aircraft. In some scenarios, server device 114A may receive a notification that the destination for the approved flight has changed (e.g., due to inclement weather at the original destination). In such scenarios, travel detection component 432 may determine that the flight is complete in response to determining that the location of the aircraft corresponds to the updated destination airport or city. Additionally or alternative, the received flight information may indicate the aircraft has landed and/or is at the gate.

In some examples, server device 114A may cease receiving information from BWTD 106 over a non-cellular communication network and may determine that the permitted flight is complete. For example, upon landing, monitored person 104 may disembark the permitted aircraft such that BWTD 106 is no longer communicatively coupled to the non-cellular wireless network on board the aircraft. In some instances, travel detection component 432 determines the amount of elapsed time since receiving a message from BWTD 106 over a non-cellular communication network. In response to determining that the elapsed time since receiving a message from BWTD 106 over a non-cellular communication network is at least a threshold amount of time, server device 114A may determine that the permitted flight is complete.

Responsive to determining the permitted flight is complete, server device 114A may resume normal monitoring of BWTD 106. For example, during normal monitoring of BWTD 106, notification component 430 of server device 114A may output notifications or alerts in response to determining that the GNSS coordinates of BWTD 106 are unavailable.

In some examples, travel detection component 432 may send a message to BWTD 106 commanding BWTD 106 to re-enable one or more communication units 343 of BWTD 106. For example, travel detection component 432 may command BWTD 106 to exit the airplane mode and re-enable the cellular communication units 352 and/or GNSS components 343 in response to determining that the permitted flight is complete.

Figure 5A:
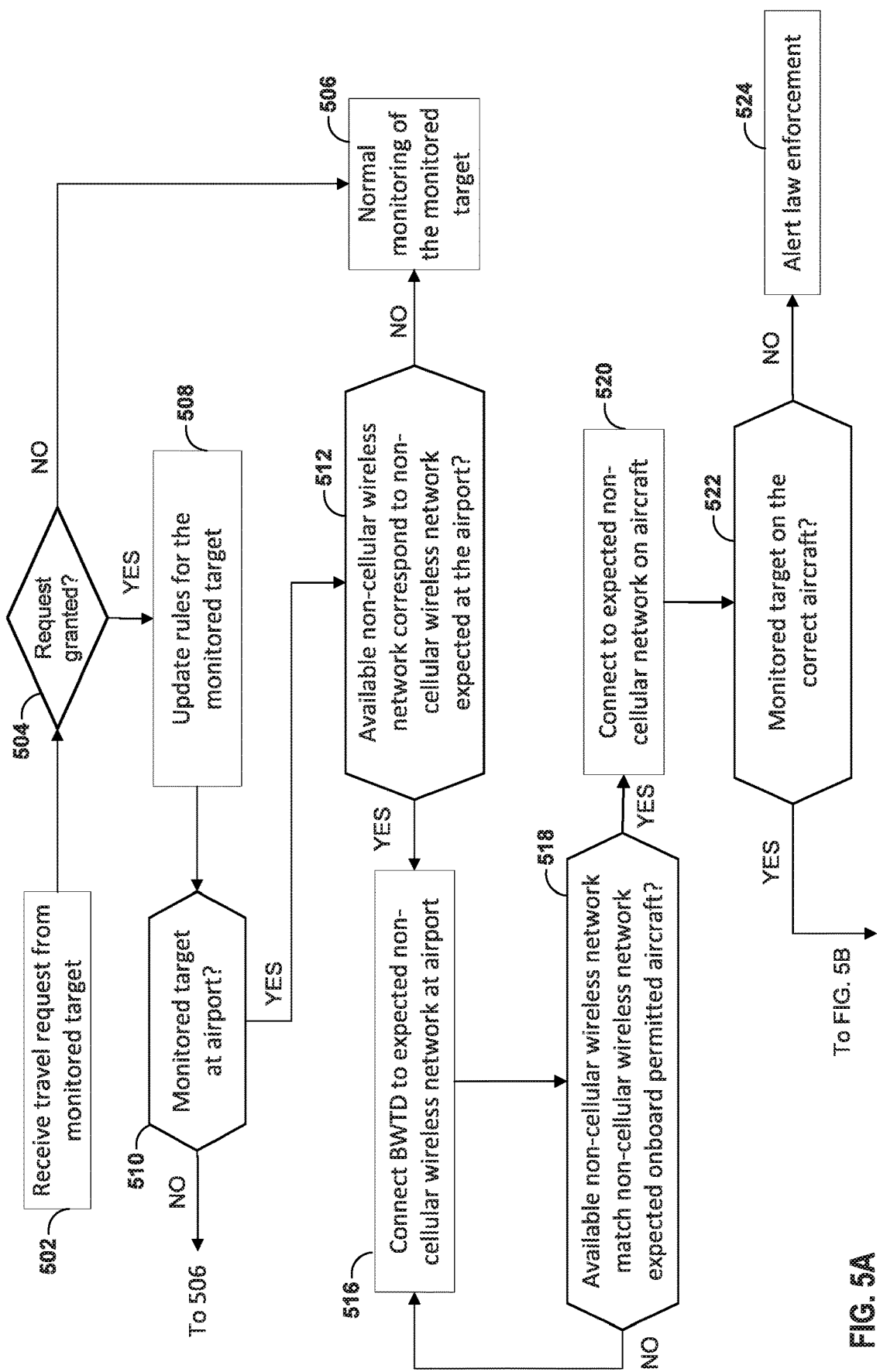
FIG. 5A includes a flow diagram illustrating example operations of a monitoring system, in accordance with aspects of this disclosure.
Figure 5B:
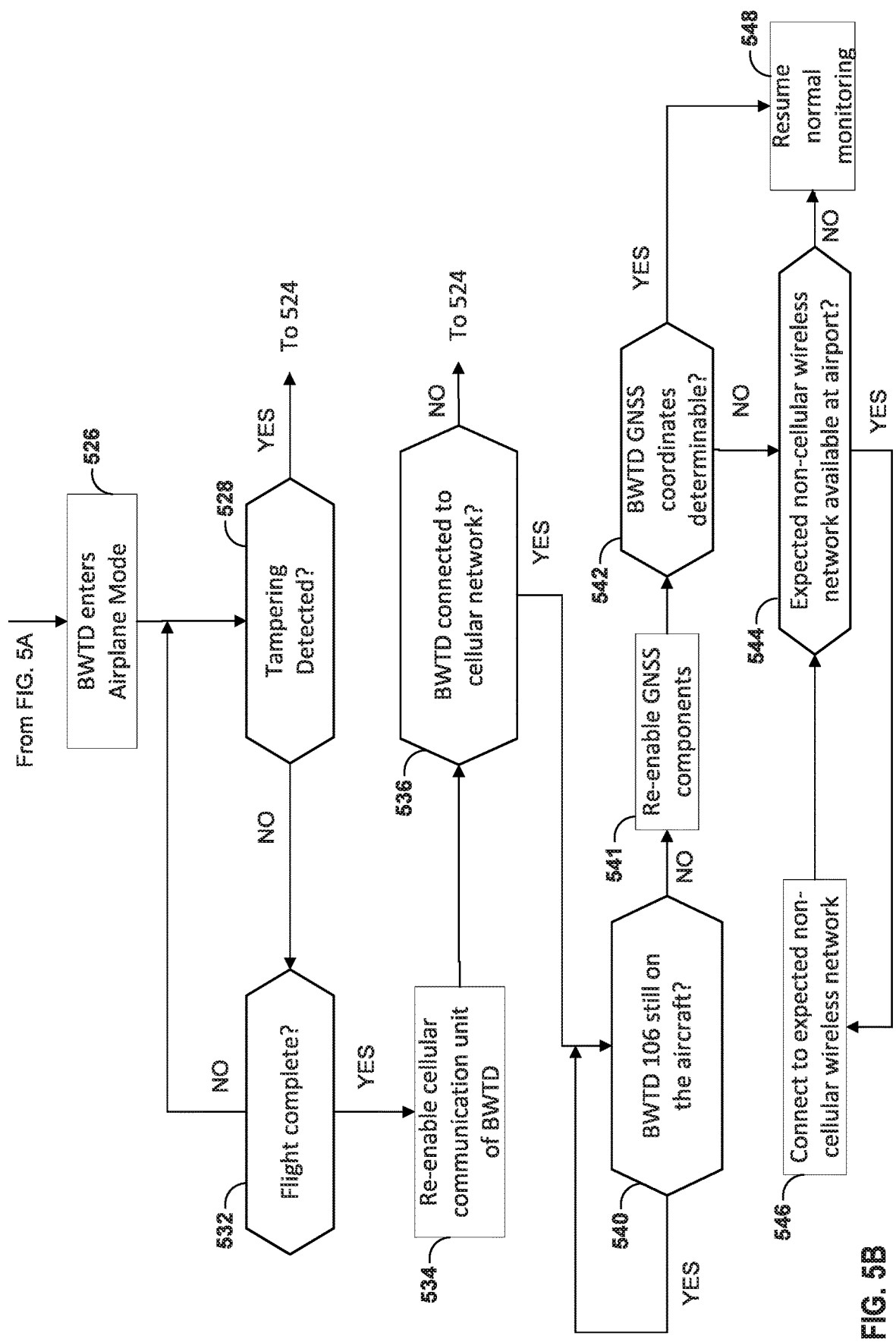
FIG. 5B includes a flow diagram illustrating example operations of a monitoring system, in accordance with aspects of this disclosure.

FIGS. 5A-5B include a flow diagram illustrating example operations of monitoring system 100, in accordance with one or more aspects of this disclosure. While described with respect to monitoring system 100 of FIG. 1, it should be understood that the process described with respect to FIG. 6 may be carried out by a variety of other systems.

In the example of FIG. 5A, monitoring center 112 receives a message from monitored target 104 requesting permission to travel (502). For example, monitored target 104 may submit a request to travel on a particular flight on particular date (e.g., computing device 107, etc.). Monitoring center 112 may store an indication of the request.

Monitoring center 112 may determine whether the travel request is granted (504). In some examples, monitoring center 112 may automatically determine whether to grant the travel request based on previous travel, terms of parole for the monitored person 104, etc. In some examples, monitoring center 112 may send the request to a user device 116 utilized by monitoring user 118 and monitoring user 118 may approve or deny the travel request. Responsive to determining that the travel request was not granted ("NO" branch of 504), monitoring center 112 and/or BWTD 106 may track monitored target 104 according to normal monitoring rules in monitoring rules 438 and rules data 322, respectively (506).

Responsive to determining that the travel request is granted, ("YES" branch of 504), monitoring system 112 and/or BWTD 106 may update the rules data for monitored target 104 (508). For example, monitoring center 112 may update monitoring rules 438 stored at server device 114A to include flight information for the travel request, such as a permitted travel date, permitted place of departure, permitted destination, flight code or flight number of a permitted flight, etc. The flight information may include wireless networking information associated with a non-cellular wireless network expected on board a permitted aircraft, a non-cellular wireless network expected to be available at a permitted airport (e.g., departure airport and/or destination airport), or both. For instance, the flight information may include a network identifier (e.g., SSID) or networking device identifier (e.g., MAC address) corresponding to a wireless network at the airport, on board the aircraft, or both.

In some instances, monitoring center 112 sends the flight information associated with the travel request to BWTD 106. In such instances, BWTD 106 may update rules data 322 to include the flight information.

In some examples, monitoring center 112 and/or BWTD 106 determines whether monitored target 104 is at an airport (510). BWTD 106 or monitoring center 112 may determine whether BWTD 106, and hence monitored person 104, is at an airport based on the GNSS coordinates of BWTD 106. For example, monitoring center 112 may determine whether the GNSS coordinates of BWTD 106 correspond to a permitted departure airport. In some instances, BWTD 106 may activate a non-cellular communication unit 354 (e.g., WiFi® component) in response to determining that BWTD 106 is located at an airport or is within a threshold distance (e.g., 1 mile, one-half mile, etc.) of the permitted departure airport. In some instances, the non-cellular communication unit 354 may be scheduled to turn on at certain times (e.g., a threshold amount of time prior to a scheduled flight) or may be always on.

In some examples, responsive to determining that monitored target 104 is at the departure airport ("YES" branch of 510), monitoring center 112 and/or BWTD 106 may determine whether an available non-cellular wireless network (e.g., WiFi® network) corresponds to a non-cellular wireless network expected to be available at the airport (512). For example, BWTD 106 and/or monitoring center 112 may determine whether an available non-cellular wireless network matches a predetermined wireless network expected to be available at the airport. For instance, BWTD 106 may compare a network identifier (e.g., SSID) or networking device identifier (e.g., MAC address) corresponding to one or more available networks to a network identifier or networking device identifier corresponding to a non-cellular wireless network expected to be available at the departure airport.

Responsive to determining that there are not any available non-cellular wireless networks that correspond to a non-cellular wireless network expected to be available at the airport ("NO" branch of 512), monitoring center 112 and/or BWTD 106 may track monitored target 104 according to normal monitoring rules in monitoring rules 438 and rules data 322, respectively (506).

In some examples, BWTD 106 connects to the expected non-cellular wireless network at the departure airport (516) in response to determining that an available non-cellular wireless network corresponds to a non-cellular wireless network expected to be available at the airport ("YES" branch of 512). BWTD 106 may deactivate GNSS components in response to determining that an available non-cellular wireless network corresponds to a non-cellular wireless network expected to be available at the departure airport ("YES" branch of 512). In some instances, BWTD 106 may automatically place the GNSS components 343 into an "airplane mode" in response to connecting to the expected non-cellular wireless network. In some instances, BWTD 106 may send a message to monitoring center 112 indicating that BWTD 106 has connected to the expected non-cellular wireless network (also referred to as predetermined non-cellular wireless network) at the airport and may receive a message from monitoring center 112 indicating that BWTD 106 may temporarily place the GNSS components 343 of BWTD 106 into the airplane mode (e.g., turn-off or enter a low-power mode). In some examples, BWTD 106 and/or monitoring center 112 may refrain from outputting notifications that the GNSS coordinates are unavailable while BWTD 106 is connected to the non-cellular wireless network expected to be available at the departure airport.

Monitoring center 112 and/or BWTD 106 may determine whether an available non-cellular wireless network corresponds to a non-cellular wireless network expected to be available on board the permitted aircraft (518). For example, BWTD 106 and/or monitoring center 112 may determine whether an available non-cellular wireless network matches a predetermined wireless network expected to be available on board the permitted aircraft. For instance, BWTD 106 may compare a network identifier (e.g., SSID) or networking device identifier (e.g., MAC address) corresponding to one or more available networks to a network identifier or networking device identifier corresponding to a non-cellular wireless network expected to be available at the departure airport. BWTD 106 may determine that the predetermined non-cellular wireless network expected to be available at the departure airport is available when the networking information (e.g., network identifier and/or networking device identifier) of the expected non-cellular wireless network matches the networking information of an available non-cellular wireless network. In some scenarios, BTWD 106 may determine that BWTD 106 is on board an aircraft based on determining whether an available non-cellular wireless network corresponds to a non-cellular wireless network expected to be available on board the permitted aircraft. In other words, when an available non-cellular wireless network corresponds to the non-cellular wireless network expected to be available on board the permitted aircraft, this may indicate that BWTD 106 is located on board the permitted aircraft. Thus, in some examples, BWTD 106 may determine that BWTD 106 is on board an aircraft in response to determining that an available non-cellular wireless network corresponds to a non-cellular wireless network expected to be available on board the permitted aircraft.

Responsive to determining that there are not any available non-cellular wireless networks that correspond to a non-cellular wireless network expected to be available on the permitted aircraft ("NO" branch of 518), BWTD 106 remains connected to the expected airport non-cellular wireless network (516). Responsive to determining that an available non-cellular wireless network corresponds to a non-cellular wireless network expected to be available on board the permitted aircraft ("YES" branch of 518), BWTD 106 may connect to the expected non-cellular wireless network on board the aircraft (520).

BWTD 106 and/or monitoring center 112 may determine whether monitored target 104 is on board the correct, permitted aircraft (522). For example, responsive to connecting to a wireless network on board an aircraft, BWTD 106 may request flight information (e.g., flight number, destination city, or other flight information) from the aircraft (e.g., from an in-flight entertainment system of the aircraft). In some examples, BWTD 106 receives the actual flight information for the aircraft and compares the actual flight information received from the aircraft to the flight information for the permitted flight. In some instances, BWTD 106 sends the actual flight information for the aircraft to which BWTD 106 is communicatively coupled to monitoring center 112 (e.g., via the non-cellular wireless network on board the aircraft and/or a cellular network). Monitoring center 112 may receive the actual flight information for the aircraft to which BWTD 106 is communicatively coupled and may determine whether BWTD 106, and hence monitored target 104, is on board the correct, permitted aircraft by comparing the actual flight information to the expected flight information for the permitted flight. For instance, BWTD 106 and/or monitoring center 112 may compare the actual flight code received from the aircraft computing system and the current date to the flight code of the permitted flight and permitted travel date. Thus, BWTD 106 and/or monitoring center 112 may determine that BWTD 106 is on board a permitted flight if the flight information received from the on board computing system corresponds to the flight information for the permitted flight.

Responsive to determining that monitored target 104 is not on board the correct, permitted aircraft ("NO" branch of 522), monitoring center 112 and/or BWTD 106 may alert monitoring user 118 (e.g., law enforcement personnel) that monitored target 104 is on board an aircraft that the monitored target 104 is not permitted to be on (524). For example, monitoring center 112 may send a notification to a user device 116 utilized by a monitoring user 118 (e.g., parole officer, airport security personnel, airline personnel, etc.) indicating that monitored person 114 is on board a flight he or she is not permitted to be on. Thus, in some scenarios, the aircraft on which monitored person 104 is located may remain grounded until monitored person 104 is no longer on board an aircraft which he or she is not permitted to be on.

Responsive to determining that monitored target 104 is on board the correct, permitted aircraft ("YES" branch of 522), BWTD 106 may enter an "airplane mode" (526). In the airplane mode, BWTD 106 may temporarily disable or deactivate GNSS components 343 of BWTD 106. Additionally or alternatively, BWTD 106 may disable or deactivate one or more cellular communication units of BWTD 106. In other words, BWTD 106 may turn-off GNSS components 343 and/or one or more cellular components of BWTD 106, or otherwise place such components into a low power state, which may increase the battery life of BWTD 106. In some examples, BWTD 106 and/or monitoring center 112 may temporarily refrain from generating alerts indicating that the current GNSS coordinates of BTWD 106 cannot be determined in response to determining that BWTD 106 is located on board an aircraft or in response determining that BWTD 106 is located on board a permitted aircraft.

BWTD 106 and/or monitoring center 112 may determine whether BWTD 106 has been tampered with during a flight (528). For example, monitoring center 112 may determine whether the non-cellular wireless communication between BWTD 106 and the permitted aircraft was lost for at least a threshold amount of time. For instance, a loss of communication between BWTD 106 and the non-cellular wireless network on board the permitted aircraft may indicate monitored user 104 attempted to shield BWTD 106 from communicating with the non-cellular wireless network on board the aircraft. Similarly, BWTD 106 may detect attempts to physically remove BWTD 106 from monitored target 104. Responsive to determining that BWTD 106 has been tampered with, monitoring center 112 and/or BWTD 106 may alert law enforcement (524). For example, monitoring center 112 may send a message to monitoring user 118 (e.g., law enforcement personnel) at the destination that indicates the identity of monitored target 104 and the flight details for monitored target 104.

BWTD 106 and/or monitoring center 112 may determine whether the permitted flight is complete (532). In some examples, BWTD 106 determines whether the flight is complete based on sensor data generated by sensor components 344. For example, BWTD 106 may receive acceleration data from accelerometer components 346 and may compare the acceleration data to a template acceleration pattern corresponding to an aircraft landing. For instance, BWTD 106 may determine that the aircraft has landed and hence the flight is complete in response to determining that at least a portion of the acceleration data generated by an accelerometer of BWTD 106 corresponds to the template acceleration pattern for an aircraft landing. In some examples, BWTD 106 and/or monitoring center 112 determines that the permitted flight is complete based on information received from the onboard computing system. For instance, BWTD 106 may receive messages from the aircraft's onboard computing system that indicate the position or location of the aircraft while BWTD 106 is connected to the aircraft wireless network. In some instances, BWTD 106 sends messages to monitoring center 112 indicating the current position of the aircraft during the flight. Responsive to receiving a message from the computing system on board the aircraft that indicates the aircraft has landed or the aircraft has arrived at its destination, BWTD 106 and/or monitoring center 112 may determine that the permitted flight is complete. BWTD 106 and/or monitoring center 112 may continue to monitor for tampering of BWTD 106 (528) and/or completion of the flight (532) in response to determining that the flight is not complete ("NO" branch of 532).

Responsive to determining that the flight is complete ("YES" branch of 532), BWTD 106 may re-enable the cellular communication units 352 (534). For example, monitoring center 112 may send a message to BWTD 106 commanding BWTD 106 to re-enable the cellular communication units 352 in response to determining that the flight is complete. In some instances, BWTD 106 may automatically re-enable the cellular communication units 352 in response to determining that the flight is complete.

BWTD 106 and/or monitoring center 112 may determine whether BWTD 106 is connected to a cellular network in response to re-enabling the cellular communication units 352. For instance, BWTD 106 may determine whether BWTD 106 is connected to a cellular network by searching for radio signals from one or more cellular towers. In some examples, monitoring center 112 may determine whether BWTD 106 is connected to a cellular network by attempting to communicate with BWTD 106 via a cellular network. In some instances, monitoring center 112 may send a message to BWTD 106 (e.g., via cellular or non-cellular communication units) commanding BWTD 106 to send a message to monitoring center 112 via the non-cellular communication units and may determine that the cellular communication is not connected to the cellular network if BWTD 106 does not send a response via a cellular network.

Responsive to determining that BWTD 106 is not connected to a cellular network ("NO" branch of 536), monitoring center 112 and/or BWTD 106 may alert law enforcement (524). For example, monitoring center 112 may send a notification to law enforcement personnel indicating that monitored person 104 is on a particular flight and that cellular communication with BWTD 106 is not working. In some instances, law enforcement personnel may meet monitored target 104 at the airport gate (e.g., to check if BWTD 106 is working properly).

Responsive to determining that BWTD 106 is connected to a cellular network ("YES" branch of 536), BWTD 106 and/or monitoring center 112 may determine whether monitored target 104 is still located on the aircraft (540). In some examples, BWTD 106 may determine whether monitored target 104 is still located on the aircraft based on sensor data generated by one or more sensor components 344 of BWTD 106. For example, BWTD 106 may determine that monitored target 104 is still on board the aircraft in response to determining that a number of steps detected by BWTD 106 since the aircraft landed is less than or equal to a threshold number of steps. For instance, the number of steps taken since landing may indicate whether the monitored target 104 has walked far enough to go from the back of the plane to the front of the plane. In some instances, BWTD 106 determines that monitored target 104 is still on board the aircraft based on the net distance (e.g., straight line distance) from a starting location to a current location. For instance, monitored target 104 may take numerous steps while on the plane but the net distance may be small (e.g., walking from his or her seat to a bathroom and then back to the seat). Thus, in some scenarios, BWTD 106 may determine that BWTD is still located on board the aircraft if the net distance traveled is less than or equal to a threshold distance. In some examples, BWTD 106 and/or monitoring center 112 may determine whether monitored target 104 is still located on board the aircraft based on whether BWTD 106 is still connected to the non-cellular wireless network on board the permitted aircraft.

If BWTD 106 and/or monitoring center 112 determines that BWTD 106 is still on board the aircraft, BWTD 106 and/or monitoring center 112 may continue to monitor BWTD 106 to determine whether and when monitored target 104 disembarks the aircraft (540). In response to determining that BWTD 106 is no longer on the aircraft, BWTD 106 may re-enable GNSS components 343 of BWTD 106. For example, BWTD 106 may automatically re-enable GNSS components 343 is response to BWTD 106 determining that BWTD 106, and thus monitored target 104, is no longer on the aircraft. In some scenarios, monitoring center 112 may determine that BWTD 106 is not on the aircraft and may send a message to BWTD 106 (e.g., via cellular communication units) commanding BWTD 106 to re-enable GNSS components 343 of BWTD 106.

BWTD 106 may determine whether the GNSS coordinates of BWTD 106 are determinable (542). For example, BWTD 106 may determine whether BWTD 106 receives signals from a sufficient number (e.g., three or more) of GNSS satellites to determine GNSS coordinates of BWTD 106. For instance, monitored target 104 may be located inside the airport at the destination of the permitted flight and the structure of the airport may block communications between BWTD 106 and one or more GNSS satellites. Responsive to determining that the GNSS coordinates of BWTD 106 are determinable ("YES" branch of 542), BWTD 106 may determine its current GNSS coordinates and resume normal monitoring of monitored target 104 (548). In some instances, BWTD 106 may disable or deactivate the non-cellular wireless communication units 354 in response to determining the GNSS coordinates of BWTD 106.

In response to determining that the GNSS coordinates for BWTD 106 cannot be determined ("NO" branch of 542), monitoring center 112 and/or BWTD 106 may determine whether a non-cellular wireless network expected to be available at the destination airport is actually available (544). Monitoring center 112 and/or BWTD 106 may determine whether an available non-cellular wireless network corresponds to a non-cellular wireless network expected to be available at the airport (518). For example, BWTD 106 and/or monitoring center 112 may determine whether an available non-cellular wireless network matches a predetermined wireless network expected to be available at the destination airport. For instance, BWTD 106 may compare a network identifier (e.g., SSID) or networking device identifier (e.g., MAC address) corresponding to one or more available networks to a network identifier or networking device identifier corresponding to a non-cellular wireless network expected to be available at the destination airport. BWTD 106 may determine that the predetermined non-cellular wireless network expected to be available at the departure airport is available when the networking information (e.g., network identifier and/or networking device identifier) of the expected non-cellular wireless network matches the networking information of an available non-cellular wireless network.

In some examples, BWTD 106 may resume normal monitoring operations (548) in response to determining that the non-cellular wireless network expected to be available at the destination airport is not available ("NO" branch of 542).

Responsive to determining that the expected non-cellular wireless network is available ("YES" branch of 542), BWTD 106 may connect to the expected non-cellular wireless network (546). In other words, if the predetermined network (e.g., WiFi® network) for the destination airport is available, BWTD 106 may connect to the predetermined network at the destination airport. BWTD 106 may send a message to monitoring center 112 indicating that BWTD 106 is still within the destination airport. In some examples, BWTD 106 and/or monitoring center 112 may refrain from outputting notifications that the GNSS coordinates are unavailable while BWTD 106 is connected to the predetermined non-cellular wireless network at the destination airport.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

What is claimed is:

1. A body-worn tracking device (BWTD) comprising:
a global navigation satellite system (GNSS) device;
a cellular communication unit;
at least one processor; and
at least one memory device comprising instructions that, when executed by the at least one processor, cause the at least one processor to:
determine whether the BWTD is located on board an aircraft; and
responsive to determining that the BWTD is located on board the aircraft:
disable the GNSS device and the cellular communication unit; and
temporarily refrain from generating an alert that indicates a current location of the BWTD cannot be determined.

2. The BWTD of claim 1, further comprising a non-cellular communication unit,
wherein execution of the instructions causes the at least one processor to determine whether the BWTD is located on board the aircraft by at least causing the at least one processor to:
receive, from a wireless communication device that is communicatively coupled to the non-cellular communication unit, a device identifier corresponding to the wireless communication device; and
determine, based on the device identifier corresponding to the wireless communication device, whether the wireless communication device is associated with the aircraft; and
determine that the BWTD is located on the aircraft based on determining that the wireless communication device is associated with the aircraft.

3. The BWTD of claim 2, wherein based on the wireless communication device being associated with the aircraft, execution of the instructions further causes the at least one processor to:
retrieve, from the at least one memory device, network access credentials associated with a wireless network expected to be available on board the aircraft; and
send, via the non-cellular communication unit and to the wireless communication device associated with the aircraft, the network access credentials; and
receive, via the non-cellular communication unit and from the wireless communication device associated with the aircraft, an indication that the network access credentials are correct,
wherein execution of the instructions causes the at least one processor to disable the GNSS device in further response to receiving the indication that the network access credentials are correct.

4. The BWTD of claim 1, wherein execution of the instructions causes the at least one processor to:
further responsive to determining that the BWTD is located on the aircraft, determine whether the aircraft is a permitted aircraft on which an individual assigned to wear the BWTD is permitted to travel,
wherein execution of the instructions causes the at least one processor to temporarily refrain from generating the alert in further response to determining that the aircraft is the permitted aircraft,
wherein execution of the instructions causes the at least one processor to determine whether the aircraft is a permitted aircraft on which an individual assigned to wear the BWTD is permitted to travel by at least causing the at least one processor to:
determine flight information for the aircraft;
determine whether the flight information for the aircraft corresponds to expected flight information for the permitted aircraft; and
determine that the aircraft is the permitted aircraft in response to determining that the flight information for the aircraft corresponds to expected flight information for the permitted aircraft.

5. The BWTD of claim 4, wherein the flight information for the aircraft includes at least one of:
flight number of the aircraft,
departure date of the aircraft,
airline associated with the aircraft,
departure location of the aircraft, or
destination location of the aircraft.

6. The BWTD of claim 4, wherein execution of the instructions causes the at least one processor to:
responsive to determining that the aircraft is not the permitted aircraft, send, to the remote computing device, a message indicating the individual assigned to wear the BWTD is located on an aircraft that is not the permitted aircraft.

7. The BWTD of claim 1, wherein execution of the instructions causes the at least one processor to determine whether the BWTD is located on the aircraft at a first time, and wherein execution of the instructions further causes the at least one processor to:
determine, at a second time that is later than the first time, whether the aircraft has landed; and
responsive to determining that the aircraft has landed:
enable the GNSS device and the cellular communication unit;
determine whether GNSS coordinates of the BWTD at the second time are known; and
responsive to determining that the GNSS coordinates of the BWTD at the second time are known, send, via the cellular communication unit and to a remote computing device,
an indication of the GNSS coordinates of the BWTD at the second time.

8. The BWTD of claim 7, wherein execution of the instructions further causes the at least one processor to:
responsive to determining that the GNSS coordinates of the BWTD at the second time are not known, determine whether a predetermined WiFi network is available; and
responsive to determining that the predetermined WiFi network is available:
connect to the WiFi network; and
send, to the remote computing device, a message indicating that the BWTD is communicatively connected to the predetermined WiFi network.

9. The BWTD of claim 1, further comprising a non-cellular communication unit, wherein execution of the instructions causes the at least one processor to determine whether the BWTD is located on the aircraft at a first time, and wherein execution of the instructions further causes the at least one processor to:
determine, at a second time that is earlier than the first time, whether the BWTD is located within a predetermined distance of an airport; and
responsive to determining that the BWTD is within the predetermined distance of the airport, enable the non-cellular communication unit.

10. The BWTD of claim 1, further comprising at least one motion sensor;
wherein execution of the instructions causes the at least one processor to determine whether the BWTD is located on an aircraft by at least causing the at least one processor to:
receive, from the at least one motion sensor, an indication of acceleration; and
determine, based on the indication of the acceleration and an acceleration profile, whether the BWTD is located on the aircraft.

11. A computing system comprising:
at least one processor; and
at least one memory device comprising instructions that, when executed by the at least one processor, cause the at least one processor to:
determine whether a body-worn tracking device (BWTD) is located on board an aircraft; and
responsive to determining that the BWTD is located on board the aircraft, temporarily refrain from generating an alert that indicates a current location of the BWTD cannot be determined.

12. The computing system of claim 11, wherein execution of the instructions further causes the at least one processor to:
receive a travel request associated with the BWTD;
receive expected flight information associated with the travel request;
determine whether the travel request has been approved; and
responsive to determining that the travel request has been approved, update monitoring rules associated with the BWTD to include the expected flight information.

13. The computing system of claim 12, wherein the expected flight information comprises a flight number, wherein execution of the instructions further causes the at least one processor to:

receive, from a travel provider, based at least in part on the flight number, information indicative of a wireless network on board a permitted flight.

14. The computing system of claim 11, wherein execution of the instructions further causes the at least one processor to:
responsive to determining that the BWTD is located on board the aircraft, send, to the BWTD, a message enabling the BWTD to disable at least one of a GNSS device of the BWTD or a cellular communication unit of the BWTD.

15. The computing system of claim 11, wherein execution of the instructions further causes the at least one processor to:
further responsive to determining that the BWTD is located on the aircraft,
determine whether the aircraft is a permitted aircraft on which an individual assigned to wear the BWTD is permitted to travel, and
temporarily refrain from generating the alert is further response to determining that the aircraft is the permitted aircraft.

16. The method of claim 15, wherein execution of the instructions further causes the at least one processor to determine whether the aircraft is a permitted aircraft on which an individual assigned to wear the BWTD is permitted to travel by causing the at least one processor to:
receive flight information for the aircraft;
determine whether the flight information for the aircraft corresponds to expected flight information for the permitted aircraft; and
determine that the aircraft is the permitted aircraft in response to determining that the flight information for the aircraft corresponds to expected flight information for the permitted aircraft.

17. The computing system of claim 16, wherein the flight information for the aircraft includes at least one of:
a flight number of the aircraft,
a departure date of the aircraft,
airline associated with the aircraft,
a departure location of the aircraft, or
a destination location of the aircraft.

18. The computing system of claim 15, wherein execution of the instructions further causes the at least one processor to:
responsive to determining that the aircraft is not the permitted aircraft, output a message indicating the individual assigned to wear the BWTD is located on an aircraft that is not the permitted aircraft.

19. The computing system of claim 11, wherein execution of the instructions causes the at least one processor to determine whether the BWTD is located on the aircraft comprises determining whether the BWTD is located on the aircraft at a first time, and wherein execution of the instructions further causes the at least one processor to:
determine, at a second time that is later than the first time, whether the aircraft has landed; and
responsive to determining that the aircraft has landed, send, to the BWTD, a command to enable the GNSS device and the cellular communication unit.

20. The computing system of claim 11, wherein execution of the instructions causes the at least one processor to determine whether the BWTD is located on the aircraft comprises determining whether the BWTD is located on the aircraft at a first time, and wherein execution of the instructions further causes the at least one processor to:
determine, at a second time that is earlier than the first time, whether the BWTD is located within a predetermined distance of an airport; and
responsive to determining that the BWTD is within the predetermined distance of the airport, send, to the BWTD, a message instructing the BWTD to enable a non-cellular wireless communication unit of the BWTD.

* * * * *